United States Patent
Kodaka

(10) Patent No.: US 7,773,583 B2
(45) Date of Patent: Aug. 10, 2010

(54) IP TELECOMMUNICATION SYSTEM, METHOD FOR CONTROLLING COMMUNICATION IN IP NETWORK, CLIENT TERMINAL AND CLIENT SERVER

(75) Inventor: Hiroshi Kodaka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/352,235

(22) Filed: Feb. 13, 2006

(65) Prior Publication Data

US 2006/0182092 A1    Aug. 17, 2006

(30) Foreign Application Priority Data

Feb. 14, 2005  (JP)  ............................ 2005-035409
Jan. 25, 2006  (JP)  ............................ 2006-015767

(51) Int. Cl.
*H04L 12/66* (2006.01)
(52) U.S. Cl. ................. 370/352; 370/386; 370/252; 709/232; 709/247; 709/217; 379/201.11
(58) Field of Classification Search ................. 370/352, 370/386; 709/232, 247, 217; 348/14.01, 348/14.03; 379/93.12, 93.19
See application file for complete search history.

(56) References Cited

U.S. PATENT DOCUMENTS

| | | | |
|---|---|---|---|
| 6,621,834 B1* | 9/2003 | Scherpbier et al. ......... | 370/532 |
| 2001/0040621 A1* | 11/2001 | Gerszberg et al. ........ | 348/14.01 |
| 2002/0067717 A1* | 6/2002 | Raschke et al. ............. | 370/386 |
| 2003/0063735 A1* | 4/2003 | Brockenbrough et al. ... | 379/245 |
| 2003/0120747 A1* | 6/2003 | Kim ........................... | 709/217 |
| 2004/0039847 A1* | 2/2004 | Persson et al. .............. | 709/250 |
| 2004/0136363 A1* | 7/2004 | Gass et al. ................... | 370/352 |
| 2004/0208165 A1* | 10/2004 | Cai et al. .................... | 370/352 |
| 2005/0193118 A1* | 9/2005 | Le et al. ..................... | 709/227 |
| 2006/0029045 A1* | 2/2006 | Kobayashi et al. .......... | 370/352 |
| 2006/0083222 A1* | 4/2006 | Miyajima et al. ........... | 370/352 |

FOREIGN PATENT DOCUMENTS

JP    2003-158534    5/2003

OTHER PUBLICATIONS

Surachet Tanwongsval, Sun Ray Thin Client, Apr. 5, 2002.*

* cited by examiner

*Primary Examiner*—Curtis Kuntz
*Assistant Examiner*—Phung-Hoang J Nguyen
(74) *Attorney, Agent, or Firm*—Antonelli, Terry, Stout & Kraus, LLP.

(57) ABSTRACT

To provide a thin client (TC) system at least capable of using a thin client terminal as a telephone terminal in a thin client system. In a personal TC (PTC) system consisting of a PTC server with a server side telephone control section consisting of a call control section, and a PTC terminal with a terminal side telephone control section consisting of a device control section and a voice packet communication section, and a handset connected to the PTC terminal, this is achieved by notifying an IP address of the PTC terminal as an communication target IP address to be notified upon call connection, and notifying the PTC terminal an IP address of a telephone terminal.

9 Claims, 17 Drawing Sheets

| TELEPHONE NUMBER | CALL CONTROL TARGET IP ADDRESS | 1001 |
|---|---|---|
| 3000 | 192.168.1.1 | |
| 3001 | 192.168.1.3 | |

_US 7,773,583 B2_

IP TELECOMMUNICATION SYSTEM, METHOD FOR CONTROLLING COMMUNICATION IN IP NETWORK, CLIENT TERMINAL AND CLIENT SERVER

INCORPORATION BY REFERENCE

The present application claims priorities from Japanese applications JP 2005-035409 filed on Feb. 14, 2005, JP 2006-015767 filed on Jan. 25, 2006, the contents of which are hereby incorporated by reference into this application.

BACKGROUND OF THE INVENTION

The present invention relates to an IP telecommunication system, a method for controlling communication in an IP network, a client terminal and a client server, and more particularly, relates to a system wherein a client terminal applied to a thin client system may be used as, for example, an IP phone or a TV phone, and a telecommunication terminal, a telecommunication method and the like.

In recent years, due to the trend of price reduction in personal computers (PCs) and network devices, companies that promote streamlining of their operations by distributing terminals such as PCs to most of their employees have become a majority. As PC prices become lower and PC usage grows, the amount of maintenance work to be performed by intra-firm device administrators increases in proportion to the number of PCs. Examples of such maintenance work include version upgrading and bugfixing of operating systems (OSs) and business applications, responding to hardware-related failures, taking measures and countermeasures against computer viruses and the like. Performing such maintenance work requires significant management costs that will increase dramatically as the numbers of employees increase.

A method of system operation called the server-client method is employed as an approach for reducing such management costs. This method involves accumulating primary programs and data at a server side for collective management, and accessing the programs and data through remote control from the PC terminals of individuals. Terminals under the server-client method are ordinary PC terminals implemented with remote control programs. However, a PC terminal using this method is not required to accumulate application programs or data other than the remote control program. This allows thin client (hereinafter referred to as TC) terminals that are not equipped with storage devices such as hard disk devices to be used as terminals under the server-client method. In light of the recent enforcement of the personal information protection law, TC terminals have been attracting attention as terminals free from personal information leakage, and as a result a server-client method using such TC terminals has been gaining popularity.

FIG. 7 is a diagram showing a TC system employing TC terminals. The TC system comprises a TC server and a plurality of TC terminals. The TC server performs processing by having processes activated by each user communicate with the TC terminals to which they correspond one-to-one. Since each TC terminal does not store communication data in external storage devices such as fixed magnetic disk devices, their primary components are input/output devices and their driver/processing sections (so-called drivers), and data communication sections. Data processing of the main body desired by a user is performed at the TC server side. Therefore, it is no longer necessary to perform updating and the like of application programs at the TC terminals. This results not only in a reduction in terminal management costs, but also in prevention of information leaking even in the event of loss or theft of TC terminals since no confidential data is retained in the TC terminals.

On the other hand, in recent years, IP phones have been rapidly spreading. For example, a basic configuration of a corporate IP phone system is shown in FIG. 8. In FIG. 8, a single telephony server or a plurality of telephony servers carry out the role of a so-called internal phone exchange device, and perform call control between telephone terminals. Telephone terminals include an IP phone 801 that connects to an IP network, or a softphone 812 that is a telephone program on a PC. The softphone is a program that controls calling and receiving operations, generally using the PC that it is running on as its own telephone terminal. In addition, by comprising an image transmitting/receiving function that uses a camera 813 as a part of the softphone's function, the softphone can also be used as a TV phone terminal or a TV conference terminal. Communication with a fixed-line telephone 831 may be achieved via a fixed telephone network 830 through a gateway device 820, while communication with a cellular phone 833 may be achieved via a cellular phone network 832.

Next, fundamental operations of an IP phone will be described using an example wherein a telephone terminal 801 dials out to a softphone 812. When dialing out from the telephone terminal 801, a telephony server 800 receives this as a callout information from the telephone terminal. After confirming the telephone status and the like of the softphone 812, the telephony server notifies the telephone terminal 801 of an IP address 843 of the softphone, and notifies the softphone 812 of an IP address 842 of the telephone terminal. Then, both telephone terminals establish connection by mutually transmitting/receiving voice packets between their IP addresses, and achieve voice communication. Image communication can be achieved through a similar connection method, wherein connection is established by mutually transmitting/receiving image packets between softphones equipped with image functions.

Several technical challenges exist when realizing IP phone functions with a TC terminal according to the above described TC system. With a TC terminal, since application programs are executed at the TC server side, the TC terminal side cannot communicate even when a softphone that is a telephone program is executed on the TC server side. Even if the communication is established, the plurality of softphones virtually running on the TC server remains as a problem, preventing identification of virtual terminals on the TC server through call control under conventional IP address exchange methods. One such call connection method is provided, for example, in JP-A-2003-158534. More specifically, JP-A-2003-158534 presents a method of solving the problem wherein TC terminals cannot be identified from the outside when a plurality of TC terminals is connected to a TC server.

In the method of the above described Patent Document 1, each telephone terminal is identified while a plurality of softphones runs on a TC server in the TC system described above. Therefore, all communications between TC terminals and exterior IP phone terminals were communications via the TC terminal, and terminal-to-terminal communication that characterizes the fundamental operations of IP phones was not achieved. Furthermore, since the method required TC terminals to exist on the same network segment as the TC server, communications by TC terminals via the outside or wireless LANs were also not achieved.

SUMMARY OF THE INVENTION

The construction of a system capable of performing communication between TC terminals and communication terminals without going through a TC server, and a communication control method thereof have been desired.

The present invention was made in consideration of the above problems. By providing a TC terminal side with a communication control means for allowing communication with, for example, a telephone on a network, call establishment between a TC terminal and a communication terminal is performed via a TC server, and communication between the TC terminal and the communication terminal is performed via the network without having to go through the TC server. Specific means thereof are as described in the claims.

According to the present invention, a TC terminal may also be used as, for example, an IP phone terminal, a TV phone terminal an image-receiving terminal or the like. Therefore, there are no risks of leaking of personal information such as address books through the use of TC terminals, and the same TC terminal can be used to securely communicate voice and images according to a user's work regardless of location, for example even at external locations such as a business trip destination or a user's home.

Also, since communication is possible without going through a TC server, optimization of processing bottlenecks and network traffic related to server processing can be achieved.

In addition, since TC terminals are unable to accumulate data, voice, images and the like, copyright protection when receiving image distribution services can also be achieved.

Other objects, features and advantages of the invention will become apparent from the following description of the embodiments of the invention taken in conjunction with the accompanying drawings.

DESCRIPTION OF THE EMBODIMENTS

Figure 9:
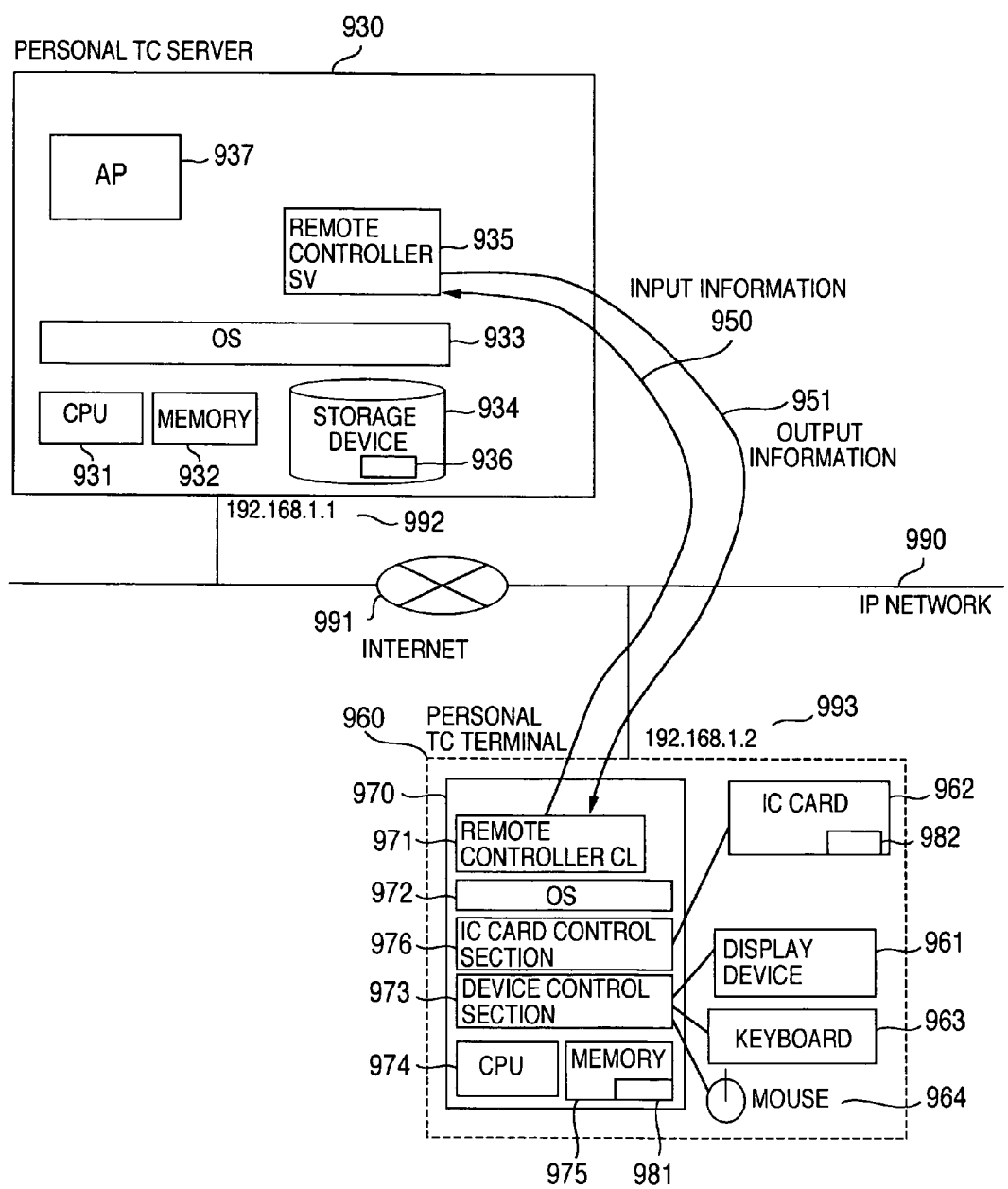
FIG. 9 is a diagram showing a configuration of a PTC system.

For the purpose of preventing information leakage caused by loss of conventional mobile PCs and the like, the present inventor first considered a personal TC system as shown in FIG. 9. More specifically, the personal TC system is composed of: a TC terminal 960 freely usable by an individual, a desktop TC server 930, for example, that manages the application programs, data and the like of the TC terminal, and a network 990 that connects them; wherein the TC server 930 comprises an OS 933, an application program 937, a storage device 934 having an area 936 for storing terminal IP addresses, a CPU 931, a memory 932, a remote controller SV935 and the like; and the TC terminal 960 comprises an OS 972, an IC card control section 976, a device control section 973, a CPU 974, a memory 975 having an area 981 for storing server IP addresses, a remote controller CL971 and the like, as well as an IC card 962 having an area 982 for storing server IP addresses, and an input/output device comprising a keyboard 963, a display device 961 and the like. Transmitting and receiving input/output information between the TC server and the TC terminal is performed by respectively transmitting/receiving IP packets between the remote controllers SV935 and CL971. The IC card 962 is used as a personal identification device to prevent illegal connection. For example, allowing or disallowing connection is controlled by storing in advance a personal identification number and a password inside the IC card 962, and matching those with a personal identification number and a password that are input upon connecting to the PTC server.

The present invention is premised on the personal TC system shown in FIG. 9. A configuration and fundamental operations of the personal TC system will now be described. In the following description, PTC will be used as an abbreviation of "personal thin client".

The PTC system is composed of a PTC server 930, a PTC terminal 960, and a network 990 that connects the two. The PTC server 930 is composed of a CPU 931, a memory 932, a storage device 934, an OS 933, an application program AP937, and a remote controller SV935. The PTC server 930 may be a desktop PC with an input/output device. The PTC terminal 960 is composed of a CPU 974, a memory 975, a device control section 973, an IC card control section 976, an OS 972, a main body 970 consisting of a remote controller CL971, input devices in the form of a mouse 964 and a keyboard 963, a display device 961, and an IC card 962.

According to the present configuration, because the PTC terminal 960 does not have an external storage device, it is incapable of executing what is called application programs. However, since the PTC terminal 960 is unable to store data such as personal information, there are no risks of information leakage when lost or the like. The network 990 is, for example, the Internet 991 or a wired LAN or a wireless LAN or the like, and is capable of identifying targets by their IP addresses.

The PTC system functions by establishing communication between the PTC server 930 and the PTC terminal 960. This establishment of the communication is achieved upon establishment of communication between the remote controllers, when the remote controller CL971 of the PTC terminal sends a communication start request to the remote controller SV935 of the PTC server, which is in a connection wait state. An IP address of the PTC server preset in the server IP address storage area 981 of the memory 975 is used as the target IP address for the transmission of the communication start request. Also, when the IC card is connected, the IP address preset in the server IP address storage area 982 of the IC card 962 is used. This enables individuals to connect to their respective PTC servers without identifying PTC terminals. When the communication start request initially arrives from the remote controller CL971, the IP address sent from the remote controller CL971 is stored in the terminal IP address storage area 936 of the storage device 934. Subsequently, communication is performed towards the stored IP address. In addition, when terminating communication, the IP address in the terminal IP address storage area 936 is erased.

When communication has already been established between the PTC server and the PTC terminal, the PTC system operates as follows. Input operation through the mouse 964 or the keyboard 963 of the PTC terminal 960 is transmitted as input information 950 from the remote controller CL971 to the PTC server 930. The remote controller SV935 of the PTC server 930 receives this information, and hands it over to the OS 933 as input information addressed to the PTC server 930. The OS 933 executes processing according to the input information from the remote controller SV935. Screen information and the like representing the results of the processing are transmitted as output information 951 from the remote controller SV935 to the PTC terminal 960. The remote controller CL971 receives this information, and outputs it onto the display device 961 via the OS 972.

The present configuration is characterized by configuring the TC server 930 without an input/output device while configuring the TC terminal 960 with only an input/output device, and remotely connecting the two. By placing the TC server 930 according to the present configuration in a secure area, possibility of information leakage can be virtually eliminated even in the event that the TC terminal 960 is lost externally.

The present invention utilizes the characteristics of such personal TC systems, and further enables audio, video and other communication functions such as a telephone function, a TV phone function, and music and image receiving functions.

Figure 1:
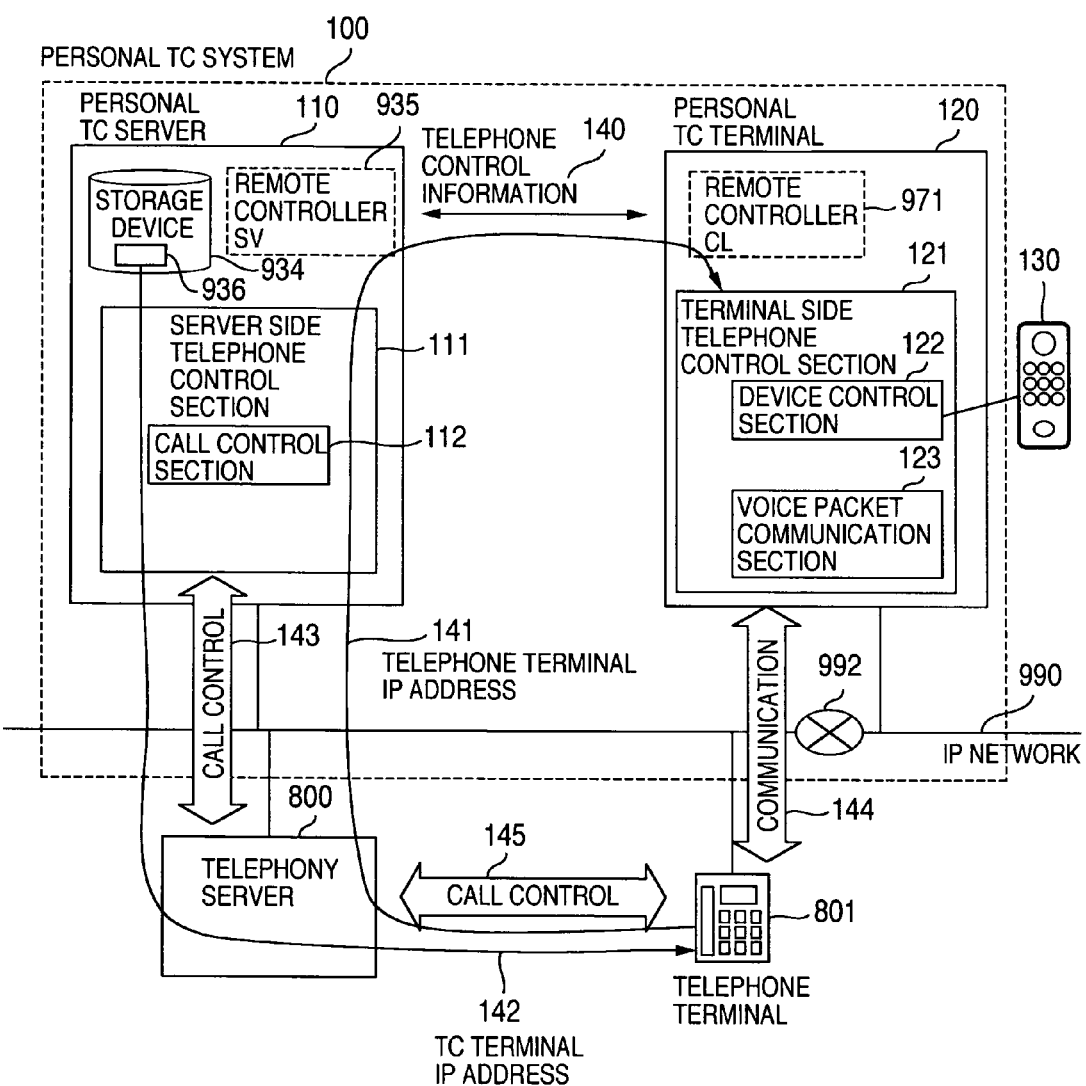
FIG. 1 is a system configuration diagram for explaining a method of implementing a telephone function according to a personal TC (PTC) system.

FIG. 1 is a diagram showing a configuration of a system for implementing a telephone function according to an embodiment of the present invention. The system configuration according to the present invention is an addition of necessary functions to the PTC server 930 and the PTC terminal 960 shown in FIG. 9. In other words, although not shown, the PTC server 110 is configured identically to the PTC server 930 in FIG. 9, except that a server side telephone control section 111 consisting of a call control section 112 is added. Also, the PTC terminal 120 is configured identically to the PTC terminal 960 in FIG. 9, except that a terminal side telephone control section 121 consisting of a device control section 122 and a voice packet communication section 123 is added. In addition, the PTC terminal 120 is configured to accept connection of a handset 130. Therefore, in the system configuration according to the present invention, the PTC system 100 is composed of a PTC server 110, a PTC terminal 120 and a network 990.

The server side telephone control section 111 performs call connection via a telephony server 800 and the call control section 112, and transmits to and receives from the terminal side telephone control section 121 telephone control information to enable the PTC terminal 120 to function as a telephone terminal.

The terminal side telephone control section 121 transmits to and receives from the server side telephone control section 111 and telephone control information 140, and provides control over the handset 130 and the voice packet communication section 123.

The device control section 122 controls the various functions of the handset 130, and is therefore implemented according to the type of the handset 130.

The handset 130 is connected to the PTC terminal 120 via, for instance, a USB interface and the like. The fundamental functions of the handset 130 include input/output of voice data, as well as key input, turning lamp on and off, off-hook, ringing tone generation and the like. Also, possible forms of the handset 130 include a fixed phone type, a headset type and other types.

Figures 10, 11:
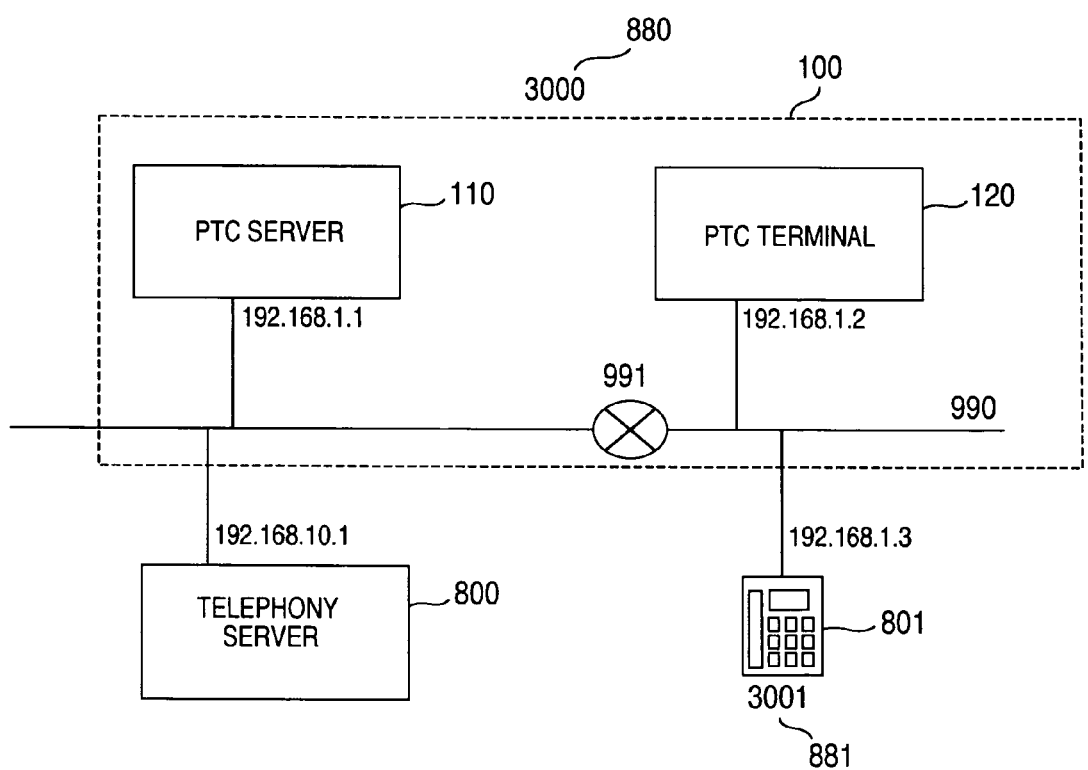
FIG. 10 is a diagram showing a telephone number management table maintained by a telephony server.
FIG. 11 is a diagram showing a specific example of allocated telephone numbers and IP addresses, for explaining operations of a telephone system.

As described above, the telephony server 800 possesses functions as a telephone exchange device for connecting telephone terminals (the PTC terminal 120 and the telephone terminal 801). In order to perform this telephone exchange function, the telephony server 800 internally comprises a telephone number management table. The management table is composed of telephone numbers and call control target IP addresses, and by referencing this table, connection target terminals may be identified by their telephone numbers, thereby enabling processing of call connections. In the PTC system 100 according to the present invention, while it is the PTC server 110 that performs call connection with the telephony server 800, a single telephone number is assigned to the PTC system 100. To give a specific example, IP addresses "192.168.1.1", "192.168.1.2", "192.168.10.1" and "192.168.1.3" are respectively assigned to the PTC server 110, the PTC terminal 120, the telephony server 800 and the telephone terminal 801. In addition, as shown in FIG. 11, the telephone numbers "3000" and "3001" are respectively assigned to the PTC system 100 and the telephone terminal 801. Furthermore, the contents of the telephone number management table of the telephony server 800 at this point are as shown in FIG. 10.

The following specific example will be described on the premise that a telephone system is configured with telephone numbers and IP addresses assigned as shown in FIG. 11. Also, the telephone terminal 801 will be described as an IP phone capable of initiating and receiving calls through call connection with the telephony server 800, and is also capable of communicating with other telephone terminals by transmitting/receiving voice packets.

Figure 12:
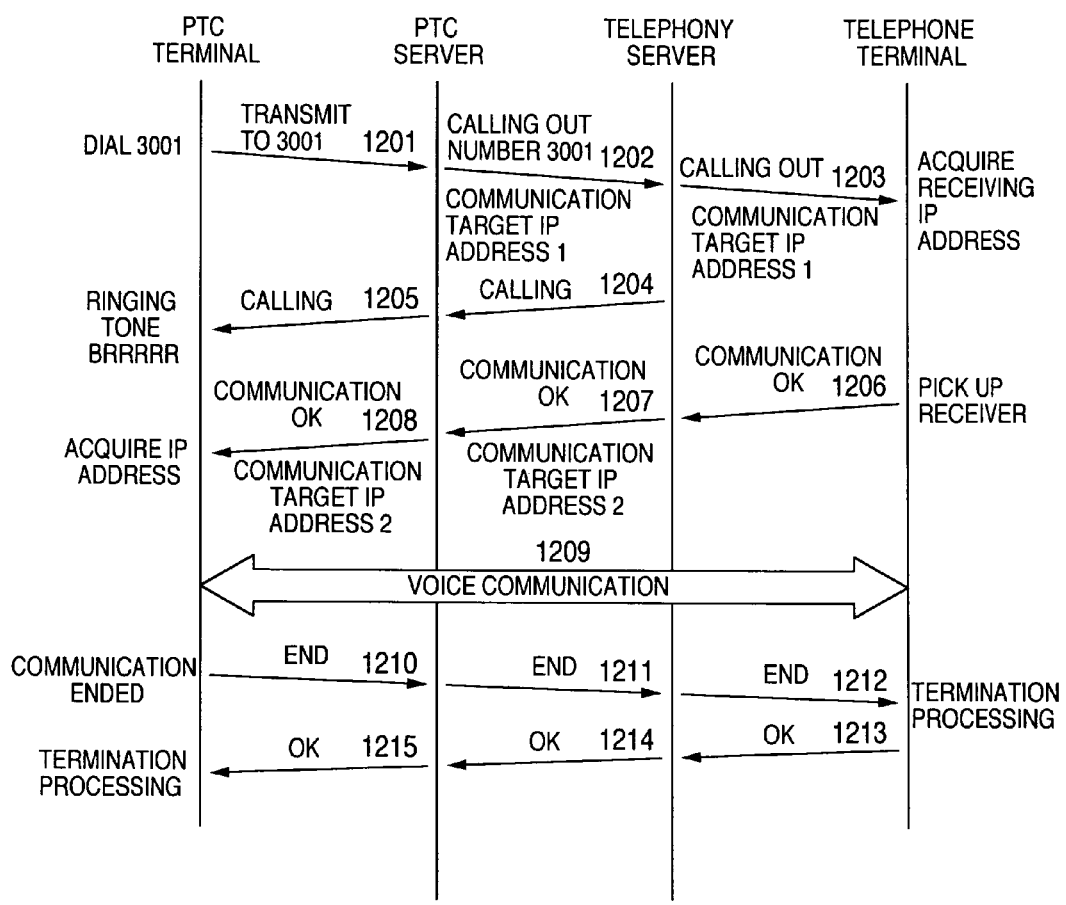
FIG. 12 is a sequential diagram showing a flow of call control when calling out from a PTC terminal to a telephone terminal.
Figure 13:
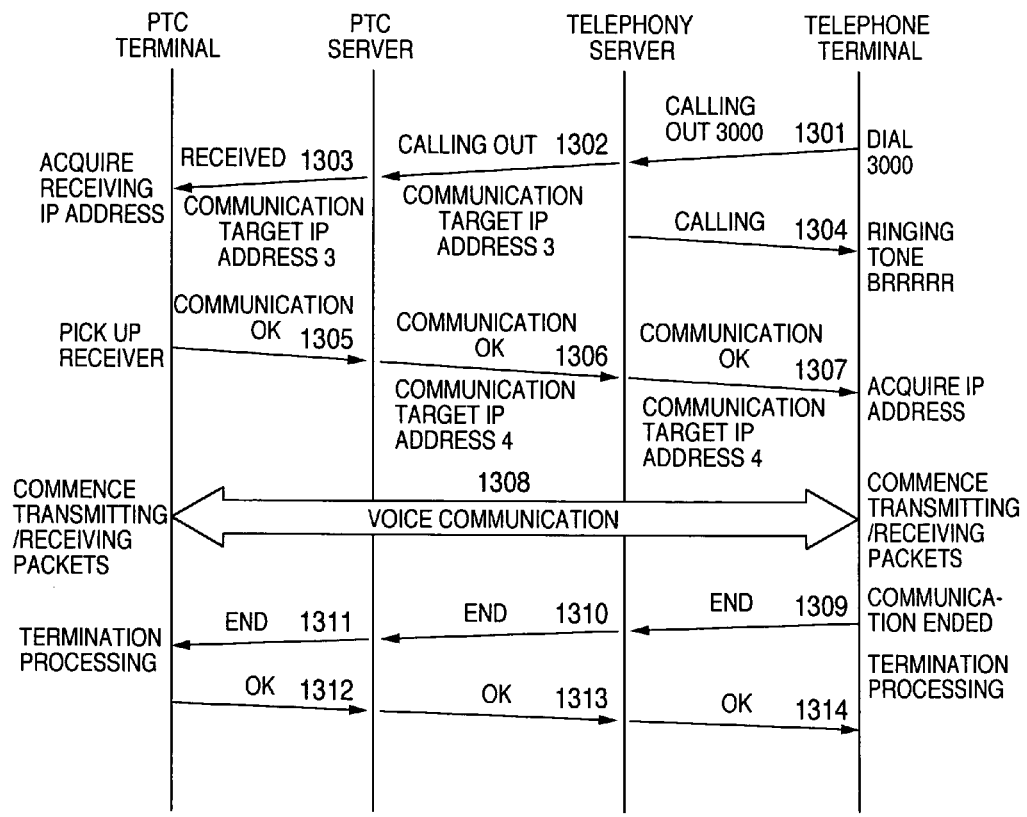
FIG. 13 is a sequential diagram showing a flow of call control when a PTC terminal receives an incoming call from a telephone terminal.

Operation of implementing a telephone function according to the PTC terminal 120 according to the present embodiment of the present invention will now be described in detail using FIGS. 12 and 13. In FIGS. 12 and 13, it is assumed that the PTC server and the telephone terminal are already registered with the IP telephony server, and the telephone number management table shown in FIG. 11 has already been created. In addition, processing of transmitting/receiving information at the PTC terminal 120 is performed by the terminal side telephone control section 121, while processing of transmitting/receiving information at the PTC server 110 is performed by the server side telephone control section 111.

FIG. 12 is a sequential diagram showing the flow of call connection when calling out from the PTC terminal 120 to the telephone terminal 801.

By dialing the phone number of a communication target telephone terminal (target telephone number) "3001" from a handset 130 mounted on the PTC terminal 120, input information 1201 requesting "callout to number 3001" is transmitted from the terminal side telephone control section 121 of the PTC terminal 120, via the remote controller CL971 as well as the remote controller SV935 of the PTC server 110, to the server side telephone control section 111.

Based on this request information, the PTC server 110 transmits call connection request information 1202 that includes the target telephone number "3001" and a communication target IP address 1 "192.168.1.2" as parameters, to the telephony server 800. At this point, the communication target IP address 1 "192.168.1.2" is stored as a parameter into a terminal IP address storage area 936 in a storage device 934. Based on the above call connection request information 1202, the IP telephony server 800 references a telephone number management table 1001 from the telephone number "3001" designated as a parameter, identifies a call connection target IP address "192.168.1.3", and transmits call connection request information 1203 to the telephone terminal 801. At this point, the IP telephony server 800 transmits the communication target IP address "192.168.1.2" received from the PTC server 110 as a parameter. At the same time, information 1204 indicating a calling status is transmitted to the PTC server 110.

Upon receiving the information 1204 indicating a calling status, the PTC server 110 transmits information 1205 indicating a calling status to the PTC terminal 120.

When the PTC terminal 120 receives the information 1205, the terminal side telephone control section 121 of the above described PTC terminal rings the handset 130 via the device control section 122 to change the status of the PTC terminal 120 to calling.

Upon receiving call connection request information 1203 from the telephony server 800, the telephone terminal 801 rings a ringing tone through reception processing, and at the same time receives the communication target IP address "192.168.1.2" transmitted as a parameter. Then, after its status changes to communicatable by lifting the receiver and the like, a communication OK 1206 is transmitted to the telephony server 800.

Upon receiving the communication OK 1206, the telephony server 800 transmits a communication OK 1207 to the PTC server with a communication target IP address 2 as a parameter. The telephone terminal IP address "192.168.1.3" obtained from the telephone number management table 1001 is set here as the communication target IP address 2.

The PTC server 110 receives the communication OK 1207, and transmits a communication OK 1208 including the parameter to the PTC terminal 120.

As the PTC terminal 120 receives the communication OK 1208, the terminal side telephone control section 121 of the above described PTC terminal sends the communication target IP address in the parameter to the voice packet communication section 123 of the above described PTC terminal. The voice packet communication section 123 designates the received communication target IP address "192.168.1.3" as the destination of the voice packet to be transmitted, and commences packet transmission (communication 1209). At the same time, it starts receiving packets sent from the other party.

On the other hand, when the telephone terminal 801 side assumes a communicatable status, it commences transmission of a voice packet addressed to the communication target IP address "192.168.1.2" received from the telephony server 800, and at the same time starts receiving packets sent from the other party.

This enables the PTC terminal 120 and the telephone terminal 801 to commence direct communication 1209.

Furthermore, while the present description involved dialing out from the handset of the PTC terminal, it is also possible to attach a dialing out function to the PTC server side. In this case, the step of information notification 1201 in the sequence shown in FIG. 12 is no longer necessary, and the sequence will start at 1202.

FIG. 13 is a sequential diagram showing the flow of an outgoing call from the telephone terminal 801 to the PTC terminal 120, or, in other words, the flow of a call connection upon receiving an incoming call at the PTC terminal 120.

When the telephone terminal 801 dials a target telephone number "3000", the telephone terminal 801 transmits a call connection request information 1301 that has the connection target telephone number "3000" as a parameter to the telephony server 800. Upon receiving the call connection request information 1301, the IP telephony server 800 references the telephone number management table 1001 and identifies a call connection target IP address "192.168.1.1", and transmits a call connection request information 1302 with a communication target IP address 3 as a parameter to the PTC server 110, while transmitting information 1304 indicating a calling status to the telephone terminal 801. The telephone terminal IP address "192.168.1.3", obtained from the telephone number management table 1001, is set as the communication target IP address 3.

Upon receiving the call connection request information 1302, the PTC server 110 transmits reception information 1303 including a parameter to the PTC terminal 120.

Upon receiving the reception information 1303, the PTC terminal 120 sounds the ringing tone of the handset 130 through the telephone control section 121 of the above described PTC terminal via the device control section 122, and notifies the communication target IP address "192.168.1.3" in the parameter to the voice packet communication section 123.

Once PTC terminal 120 assumes a communicatable state through operation of the talk button on the handset 130 or the like, it transmits a communication OK 1305 to the PTC server 110.

Upon receiving the communication OK 1305, the PTC server 110 sets the IP address "192.168.1.2" of the PTC terminal 120, stored in the terminal IP address storage area 936 in the storage device 934, as a parameter, and transmits a communication OK 1306 to the telephony server 800.

Upon receiving the communication OK 1306, the telephony server 800 transmits a communication OK 1307 including a parameter to the telephone terminal 801.

Upon receiving the communication OK 1307, the telephone terminal 801 acquires a communication target IP address 4 from the parameter, and commences transmission of a voice packet by setting the IP address as the destination for the voice packet transmission. At the same time, it starts receiving packets from the other party.

On the other hand, when the terminal side telephone control section 121 of the PTC terminal 120 becomes communicatable, the voice packet communication section 123 commences transmission of a voice packet by setting the notified communication target IP address 3 "192.168.1.3" as the destination of the voice packet to be transmitted. At the same time, it starts receiving packets from the other party.

This enables the PTC terminal 120 and the telephone terminal 801 to commence direct communication 1308. Also, as shown in FIGS. 12 and 13, initiating and receiving calls as well as communication are now possible between the telephone terminal 801 and the PTC terminal 120, thereby enabling use of the PTC terminal 120 as a single telephone terminal.

In addition, while the IP address exchange procedures between communication terminals shown in FIGS. 12 and 13 are the same procedures seen in Voice over IP call control technology (such as ITU-T H.323 or IETF SIP), as long as IP addresses can be exchanged between telephone terminals, the present invention is not dependent on the use of either call control procedure.

This also applies to cases where a plurality of telephony servers 800 are used, or alternate telephone exchange means is used.

According to the embodiment shown in FIG. 1, when connecting the handset 130, dialing input upon calling out or operations upon receiving incoming calls may be performed in the same way as with a conventional telephone.

Also, by implementing the server side telephone control section 111 as an application program, many telephone functions may be used. Since the PTC server 110 is equipped with a storage device, in addition to configuration of a telephone function, a phonebook function or an incoming/outgoing call history function may also be used.

In addition, as seen with the above described embodiment, by placing the PTC server 110 inside a secure area, leakage of personal information such as a phonebook, which is a function of the server side call control section, can be prevented even when the PTC terminal 120 is lost.

The above embodiment described a configuration and method enabling the PTC terminal to be used as a telephone terminal.

A configuration and a method for implementing the PTC terminal to be used as a TV phone terminal will now be described.

Figure 14:
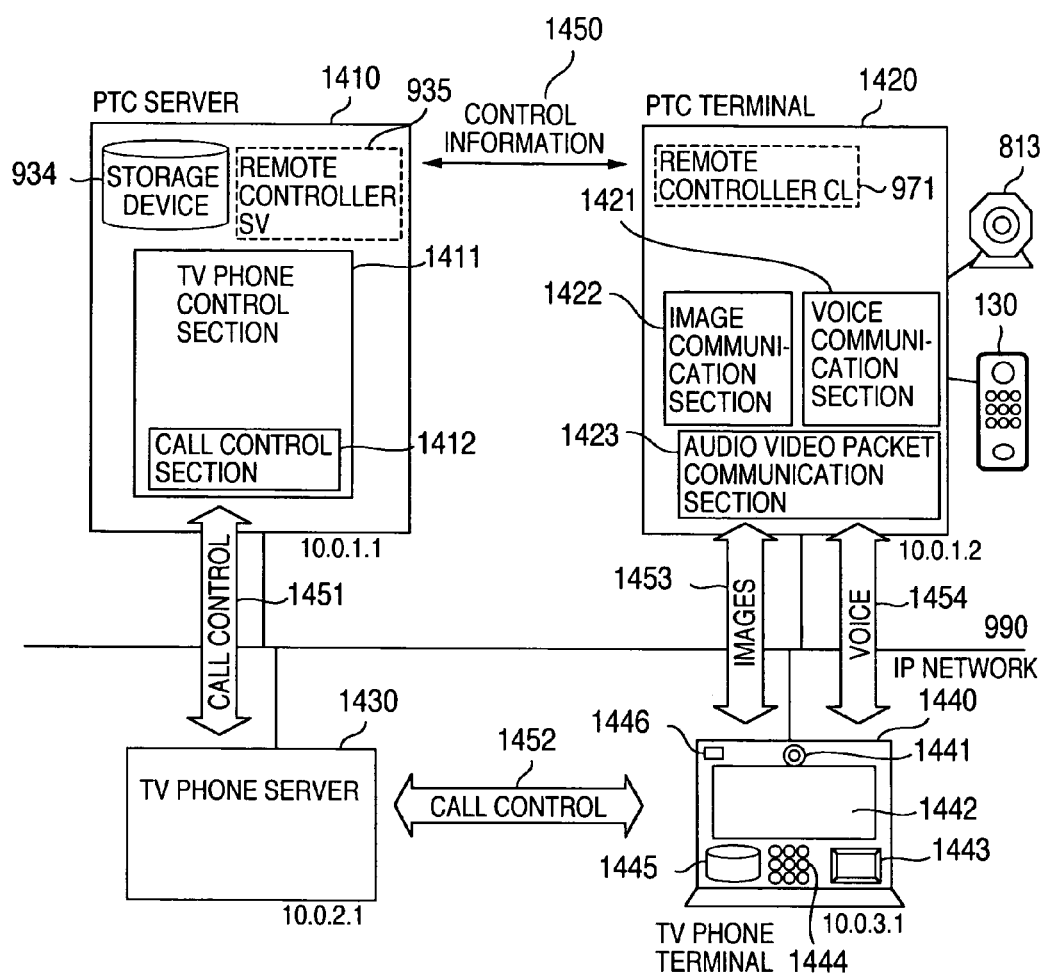
FIG. 14 is a diagram showing a configuration of a system for implementing a TV phone, according to a PTC system.

FIG. 14 is a diagram showing a configuration of a system for implementing a TV phone function according to an embodiment of the present invention. More specifically, the configuration is composed of: a PTC terminal 1420 comprising a voice communication section 1421, an image communication section 1422 and a packet transmitting/receiving section 1423; a PTC server 1410 comprising a TV phone control section 1411 with a call control section 1412; a TV phone server 1430 capable of establishing voice and image communication between a plurality of TV phone terminals; a TV phone terminal 1440 capable of voice and image transmission/reception in a designated format and comprising, for example, a microphone 1446, a speaker 1443, a dial key 1444, a camera 1441 and a display screen 1422, and an IP network 990 integrating all of the above.

According to the present system configuration, the PTC server 1410 and the PTC terminal 1420 are respectively configured by adding necessary functions to the PTC server 930 and the PTC terminal 960 shown in FIG. 9. In other words, although not shown, the PTC terminal 1420 is configured identically to the PTC terminal 960 in FIG. 9, except that an audio video packet communication section 1423 capable of transmitting/receiving voice and image data as IP packets, an voice communication section 1421 enabling voice communication and controlling a handset 130, and an image communication section 1422 enabling image communication and controlling a camera 813 are added. Also, although not shown, the PTC server 1410 is configured identically to the PTC server 930 in FIG. 9, except that a TV phone controlling section 1411 including a call control section 1412 and controlling the voice communication section 1421 and the image communication section 1422 in the PTC terminal via a remote controller is added as one of the application programs 937.

As described above, the PTC server 1410 retains an IP address of the PTC terminal inside the storage device 934, as well as communication attribute information such as voice codec information that can be handled by the voice communication section 1421, and image format information that can be handled by the image communication section 1422. In this case, it is assumed that "MPEG2" and "MPEG4" are stored as image format information.

The TV phone terminal 1440 retains communication attribute information such as voice codec information and image format information that it can handle in a storage area 1445. In this case, it is assumed that "MPEG1" and "MPEG4" are stored as image format information.

In the present system configuration, "10.0.1.1", "10.0.1.2", "10.0.2.1" and "10.0.3.1" are respectively assigned to the PTC server 1410, the PTC terminal 1420, the TV phone server 1430 and the TV phone terminal 1440 as IP addresses for communication.

Next, the flow of establishing connection between a PTC terminal and a TV conference terminal according to the present configuration will be described in detail using the sequential diagrams of FIGS. 15 and 16.

Figure 15:
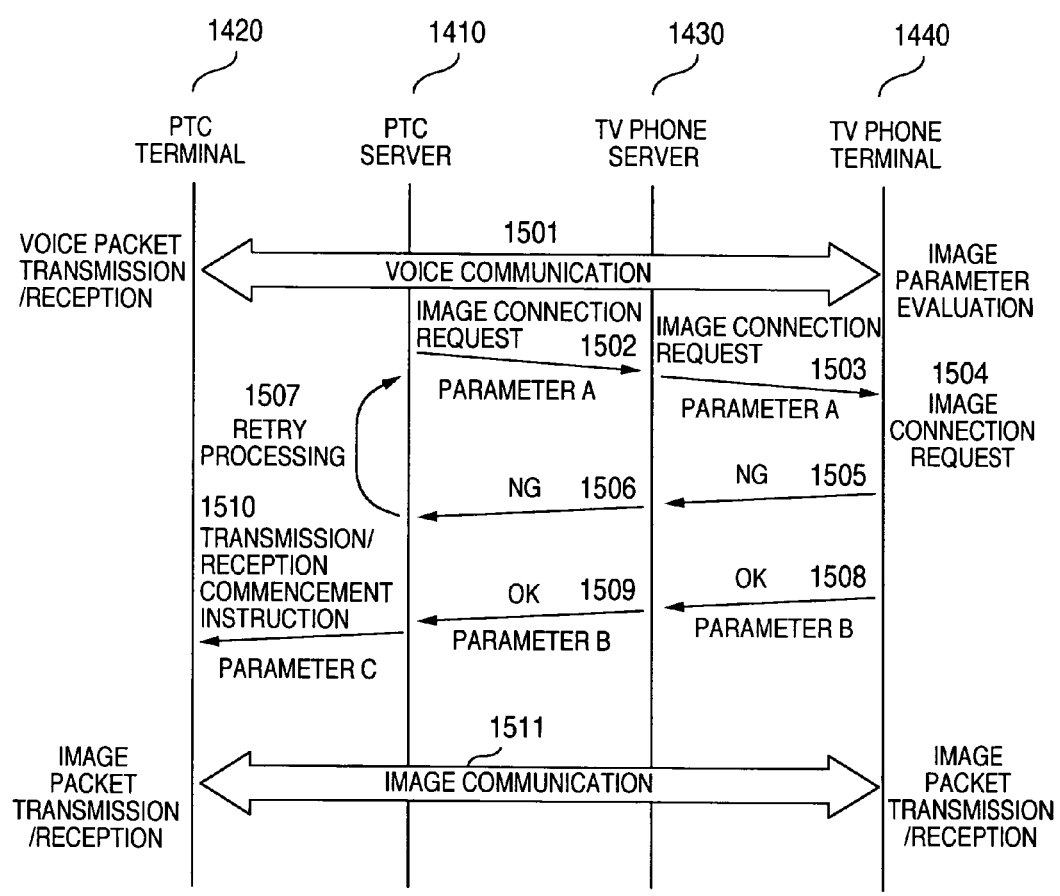
FIG. 15 is a sequential diagram showing a flow for establishing connection for image communication from a PTC terminal to a TV phone terminal.
Figure 16:
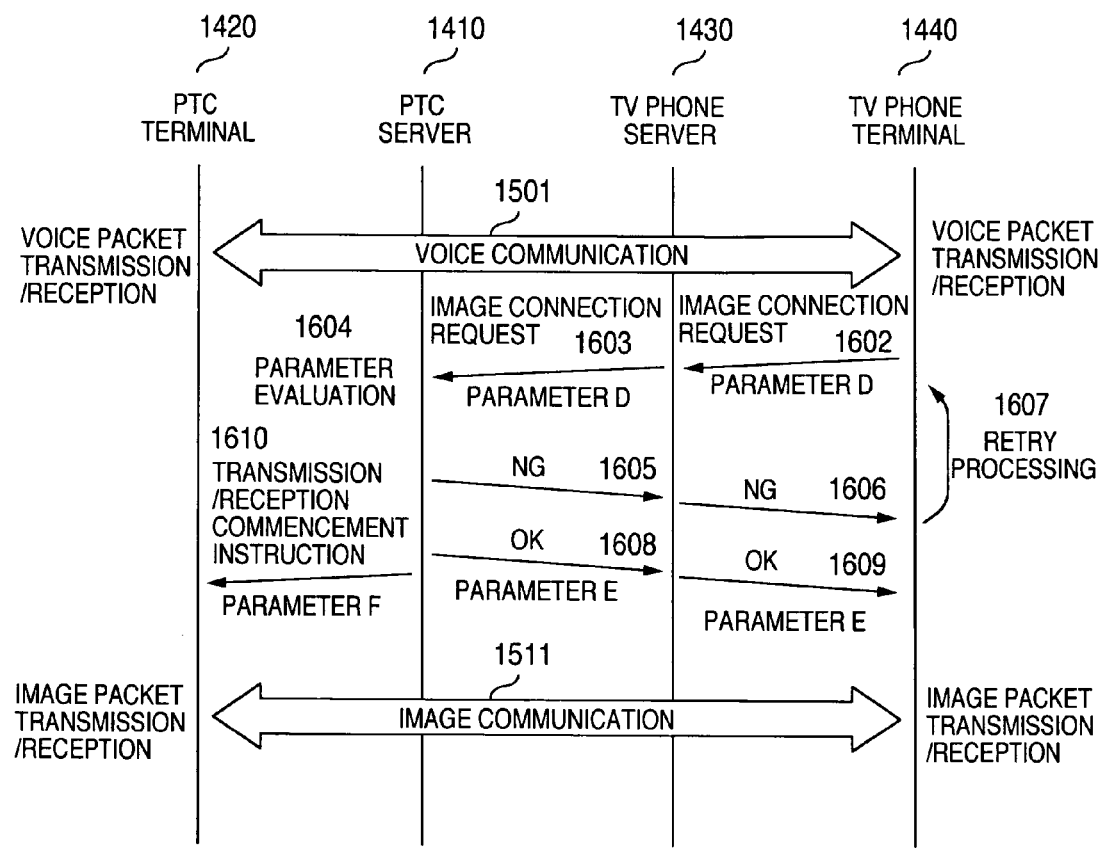
FIG. 16 is a sequential diagram showing a flow for establishing connection for image communication from a TV phone terminal to a PTC terminal.

Regarding FIGS. 15 and 16, description of the flow of connection establishment preceding voice communication 1501 has already been provided as steps 1201 to 1208 of FIG. 12, and steps 1301 to 1307 of FIG. 13, and therefore will be omitted here.

FIG. 15 shows the sequence for establishing connection for image communication 1511 from the PTC terminal 1420 to the TV phone terminal 1440.

First, the PTC server 1410 transmits an image connection request to the TV phone server 1430 (step 1502).

The IP address of the PTC terminal 1420 and a top candidate of image format information that can be handled by the PTC terminal are set as a parameter A that is added to the transmission at this point. To be specific, the IP address is "10.0.1.2" and the image format information is "MPEG2".

Upon receiving the transmission, the TV phone server 1430 transmits an image connection request together with the parameter A to the TV phone terminal 1440 (step 1503).

Upon receiving the request, the TV phone terminal 1440 performs a parameter evaluation to determine whether image communication is possible in the requested image format (step 1504).

In this case, since the requested image format information is "MPEG2", the terminal determines that the request does not match its own capabilities, and a negative result is obtained.

When the evaluation is negative, a negative result is transmitted to the TV phone server 1430 (step 1505).

The TV conference server 1430 receives the negative result, and in turn transmits a negative result to the PTC server 1410 (step 1506).

Upon receiving the negative result, the PTC server 1410 tracks down a next candidate from the image format information and sets it as the parameter A, and performs a retry process of retransmitting the image connection request 1502 (step 1507).

In this case, "MPEG4" is tracked down as the next candidate, and is set as the parameter A.

Again, after going through steps 1502 and 1503, a parameter evaluation is performed by the TV phone terminal 1440 (step 1504).

This time, since the requested image format is "MPEG4", the terminal determines that the request matches its own capabilities, and a positive result is obtained.

When the evaluation is positive, a positive result is transmitted to the TV phone server 1430 (step 1508).

At this point, the terminal attaches a parameter B that is set to its own IP address "10.0.3.1".

Upon receiving the transmission, the TV phone server 1430 transmits a positive result attached with the parameter B to the PTC server 1410 (step 1509).

Upon receiving the positive result, the PTC server 1410 transmits an image transmission/reception commencement instruction to the PTC terminal 1420 (step 1510).

The IP address of the communication target terminal, together with image format information, is set as a parameter C that is attached to the transmission at this point. To be specific, the IP address is set to "10.0.3.1" and the image format information is set to "MPEG4", which was finalized in the above step.

Upon receiving the transmission, the PTC terminal 1420 commences transmission to and reception from the notified IP address "10.0.3.1" of image packets in the notified image format "MPEG4".

On the other hand, after performing step 1508, the TV phone terminal 1440 commences transmission to and reception from the IP address "10.0.1.2" obtained with the parameter A of image packets in "MPEG4", which is the image format finalized in the above step.

This enables the PTC terminal 1420 and the TV conference terminal 1440 to establish image communication 1511, and configures image communication 1453 via the above described network 990.

FIG. 16 shows the sequence for establishing connection for image communication 1511 from the TV phone terminal 1440 to the PTC terminal 1420.

First, the TV phone server 1440 transmits an image connection request to the TV phone server 1430 (step 1602).

The IP address of the TV phone terminal 1440 and a top candidate of image format that can be handled by the TV phone terminal 1440 are set as a parameter D that is attached to the transmission at this point. To be specific, the IP address is "10.0.3.1" and the image format is "MPEG1".

Upon receiving the transmission, the TV phone server 1430 transmits an image connection request together with the parameter D to the PTC server 1410 (step 1603).

Upon receiving the request, the PTC server 1410 performs a parameter evaluation to determine whether image communication is possible in the requested image format (step 1604).

In this case, since the requested image format is "MPEG1", the terminal determines that the request does not match its own capabilities, and a negative result is obtained.

When the evaluation is negative, a negative result is transmitted to the TV phone server 1430 (step 1605).

The TV conference server 1430 receives the negative result, and in turn transmits a negative result to the TV phone terminal 1440 (step 1606).

Upon receiving the negative result, the TV phone terminal 1440 tracks down a next candidate from the image format information and sets it as the parameter D, and performs a retry process of retransmitting the image connection request 1602 (step 1607).

In this case, "MPEG4" is tracked down as the next candidate, and is set as the parameter D.

Again, after going through steps 1602 and 1603, a parameter evaluation is performed by the PTC server 1410 (step 1604).

This time, since the requested image format is "MPEG4", the terminal determines that the request matches its own capabilities, and a positive result is obtained.

When the evaluation is positive, the PTC server 1410 transmits a positive result to the TV phone server 1430 (step 1608), and transmits a transmission/reception commencement instruction to the PTC terminal 1420 (step 1610).

In step 1608, a parameter E set to the IP address "10.0.1.2" of the PTC terminal is attached.

In step 1610, the IP address of the communication target terminal, and image format, are set as a parameter F that is attached to the transmission at this point. To be specific, the IP address is set to "10.0.3.1", which was obtained from the parameter D, and the image format is set to "MPEG4", which was finalized in the above step.

Upon receiving the positive result of step 1608, the TV phone server 1430 transmits a positive result attached with the parameter E to the TV phone terminal 1440 (step 1609).

Upon receiving the positive result, the TV phone terminal 1440 commences transmission to and reception from the IP address "10.0.1.2" obtained with the parameter E, of image packets in "MPEG4", which is the image format finalized in the above step.

On the other hand, after receiving step 1610, the PTC terminal 1420 references the parameter F, and commences transmission to and reception from the notified IP address "10.0.3.1" of image packets in the notified image format "MPEG4".

Image communication 1511 is hereby established between the PTC terminal 1420 and the TV conference terminal 1440, and enables configuration of an image communication 1453 via the above described network 990.

Since voice and image communications are established independently, the present embodiment allows separating terminals used for voice communication from those used for image communication, and also enables establishment of voice-only or image-only communication and the like.

In addition, voice and image connections between a plurality of PTC terminals may be achieved, and TV conferences may be easily realized through the present configuration.

Furthermore, by respectively providing the PTC server and the TV conference terminal with the communication establishing means of the TV phone server, connection may be achieved without going through the TV phone server.

The present embodiment is characterized in that the PTC server is provided with the image format capability of the PTC terminal, and exchanges this image format capability with that of the TV phone terminal, and that both decide a mutually communicatable image format.

In addition, while a capability exchange of image formats was described in the present embodiment, the present invention is not limited to the capability exchange of image formats, and may be utilized as a method for absorbing the differences between the capabilities of communication terminals such as in the exchange of codec in voice data or character fonts in texts.

The above embodiment described a configuration and method enabling the PTC terminal to be used as a TV phone terminal.

Next, a configuration and a method for implementing the use of the PTC terminal as a terminal that functions by connecting to a content distribution server of, for example, music or films will be described.

Figure 17:
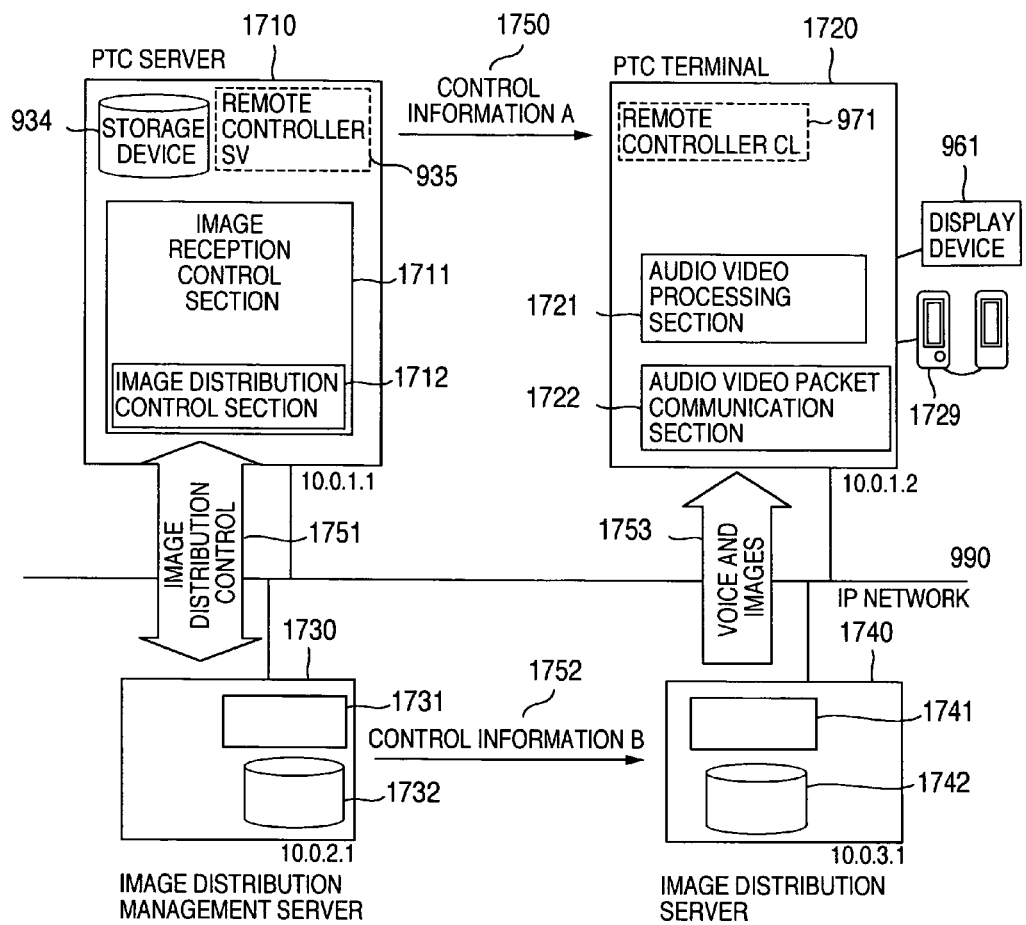
FIG. 17 is a diagram showing a configuration for a system for implementing an image receiving function at a PTC terminal.

FIG. 17 is a diagram showing a configuration of a system for implementing an image receiving function according to an embodiment of the present invention. More specifically, the configuration is composed of: a PTC terminal 1720 for playing received image contents; a PTC server 1710 that controls the PTC terminal 1720 with control information A 1750 and comprises an image distribution control section 1712 and an image reception control section 1711; an image distribution server 1740 comprising a storage device 1742 for storing image contents, and a program 1741 for distributing image contents to designated terminals based on control information B 1752; an image distribution management server 1730 that controls the image distribution server 1740 and comprises a program 1731 for performing image distribution control; and a network 990 connecting all of the above.

According to the present system configuration, the PTC server 1710 and the PTC terminal 1720 are configured by respectively adding necessary functions to the PTC server 930 and the PTC terminal 960 shown in FIG. 9. In other words, although not shown, the PTC terminal is configured identically to the PTC terminal 960 in FIG. 9, except that an audio video packet communication section 1722 that extracts voice data and image data from audio video data received as IP packets, an audio video processing section 1721 that respectively outputs voice data to a speaker and image data to a screen display by synchronizing the voice data with the image data according to an conversion method designated by control information A 1750, and a speaker 1729 to be externally connected. Also, although not shown, the PTC server 1710 is configured identically to the PTC server 930 in FIG. 9, except that an image reception control section 1711 that includes an image distribution control section 1712 is added as one of the application programs 937.

The PTC server 1710 retains image format information and the like that can be handled by the audio video processing section 1721 of the PTC terminal 1720 inside the storage device 934.

The image distribution management server 1732 retains image format information and the like that can be distributed by the image distribution server 1740 in a storage area 1732.

In the present system configuration, in order to realize image communication, "10.0.1.1", "10.0.1.2", "10.0.2.1" and "10.0.3.1" are respectively assigned to the PTC server 1710, the PTC terminal 1720, the image distribution management server 1730 and the image distribution server 1740 as IP addresses.

Figure 18:
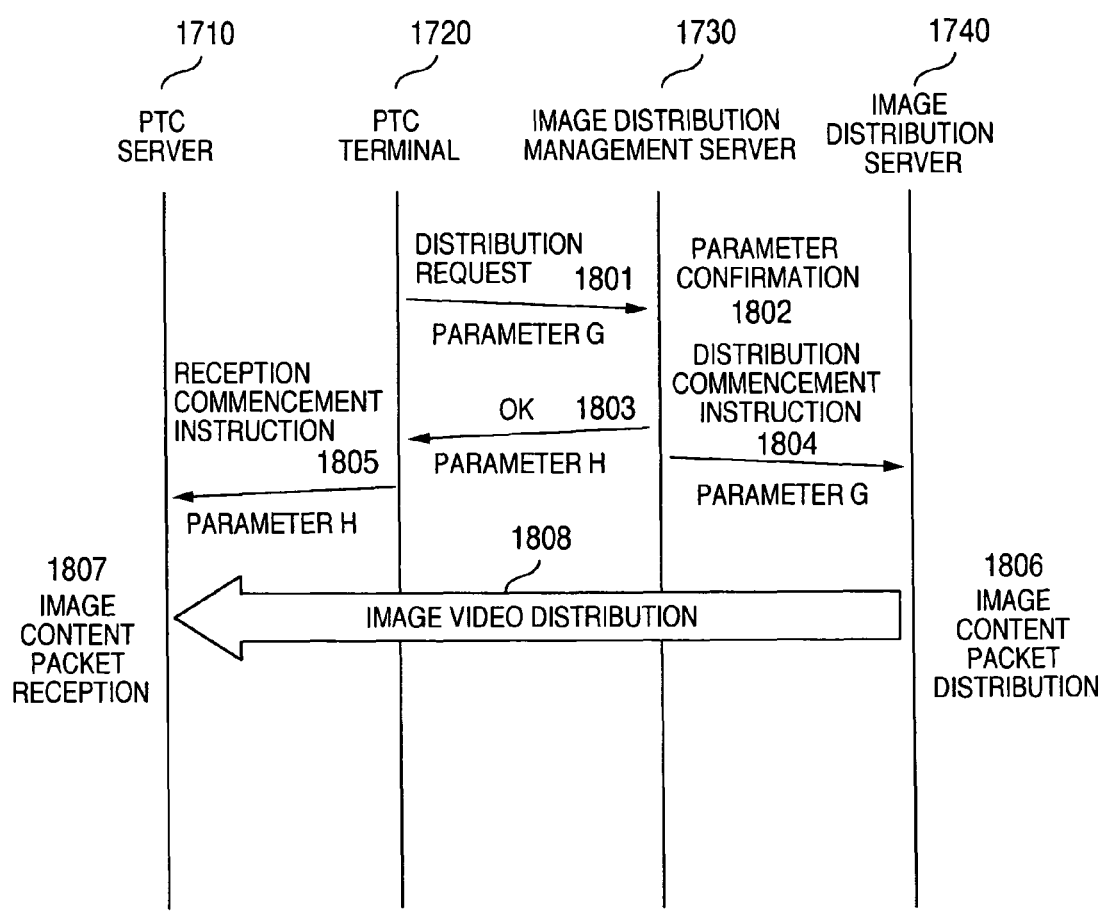
FIG. 18 is a sequential diagram showing a flow for establishing connection for image distribution between a PTC terminal and an image distribution server.

The flow of establishing image distribution connection between the PTC terminal 1720 and the image distribution server 1740 according to the present configuration will now be described in detail using the sequential diagram of FIG. 18.

First, the PTC server 1710 transmits an image distribution request attached with a parameter G to the image distribution management server 1730 (step 1801).

The parameter G is for setting information necessary for image distribution, and designates, for example, which image content is distributed to which terminal using which image format. In this case, the image content is set to "Film 1", the image format to "MPEG4", and the distribution target IP address to "10.0.1.2".

Upon receiving the request, the image distribution management server 1730 confirms the designation contents of the parameter G (step 1802).

If the confirmation does not reveal any problems, a positive result attached with a parameter H is transmitted to the PTC server 1710 (step 1803), while a distribution commencement instruction attached with the parameter G is transmitted to the image distribution server 1740 (step 1804).

Finalized information on image distribution is set in the parameter H of step 1803. In this case, the IP address of the image distribution server is set to "10.0.3.1", and the image format information is set to "MPEG4", and so on.

Upon receiving the positive result of step 1803, the PTC server 1710 attaches the received parameter H to a reception commencement instruction, and sends the instruction to the PTC terminal 1720 (step 1805).

On the other hand, after receiving the distribution commencement instruction of step 1804, the image distribution server 1740 commences image distribution of the designated image content "Film 1" to the designated IP address "10.0.1.2" in the designated image format "MPEG4", according to contents designated by the parameter G (step 1806).

After receiving the reception commencement instruction of step 1805, the PTC terminal 1720 commences reception of the image packets forwarded from the designated IP address "10.0.3.1", and plays the received image data in the designated image format "MPEG4", according to contents designated by the parameter H (step 1807).

Image distribution 1808 is hereby established between the image distribution server 1740 and the PTC terminal 1720, allowing the PTC terminal 1720 to play image contents.

The image distribution management server 1730 may be housed together with the image distribution server 1740.

Also, if differences in image format arise between the distribution server and the terminal, such differences may be solved by applying the capability resolution method of FIG. 15 (steps 1502 to 1507) to steps 1801 to 1803.

In addition, while an implementation of connection to an image content distribution server has been described in the present embodiment, the PTC terminal can be connected to content distribution servers that distribute, for example, music contents or text contents such as news, by using the exact same method. The present embodiment is characterized in that the information retained by the PTC server on image formats that can be handled by the PTC terminal is exchanged with the information retained by the image distribution management server on image formats of the image distribution server, thereby enabling the PTC terminal to receive image data from the image distribution server.

Figure 2:
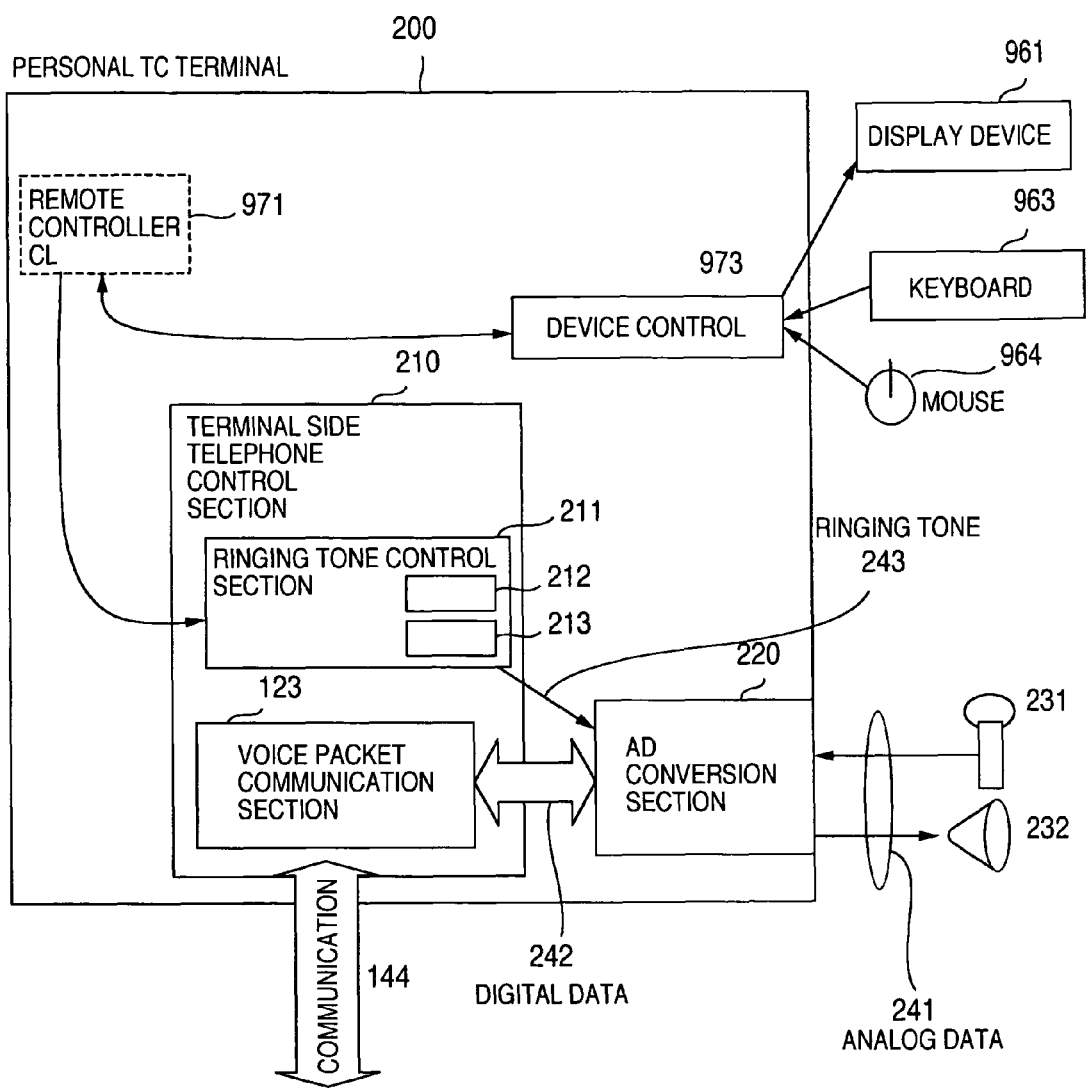
FIG. 2 is a diagram showing a configuration of a microphone and a speaker connected to a PTC terminal.

FIG. 2 is a diagram showing a block configuration of the PTC terminal 200 equipped with a microphone 231 and a speaker 232, according to an embodiment of the present invention. In the present embodiment, the PTC terminal 120 of FIG. 1 is configured so as to allow connection of the microphone 231 and the speaker 232, instead of the handset 130. In FIG. 2, the PTC terminal 200 comprises an analog digital conversion section 220 (hereinafter referred to as AD conversion section), and is configured to accept connection of the microphone 231 and the speaker 232 to the AD conversion section. A terminal side telephone control section 210 is equipped with a ringing tone control section 211. The AD conversion section 220 and the ringing tone control section 211 are not restricted to any particular form of implementation, and may be hardware, firmware or software.

The method of implementing communication function according to the configuration of FIG. 2 is as follows. In the communication 1209 state of FIG. 12, analog data 241 input to and/or output from the microphone 231 and the speaker 232 is passed through the AD conversion section 220 and converted into digital data 242, which is then input to and/or output from a voice packet communication section 123 to achieve communication with a target.

The method of implementing a calling tone and a ringing tone according to the configuration of FIG. 2 is as follows. In the case of a calling tone, in FIG. 12, as the PTC terminal 200 receives information 1205 indicating a calling state, the terminal side telephone control section 210 notifies the ringing tone control section 211 to generate tone. Upon receiving the notification, the ringing tone control section 211 transmits calling tone data 212 to the AD conversion section 220, and a calling tone is produced from the speaker 232. Also, in the case of a ringing tone, in FIG. 13, as the PTC terminal 200 receives an incoming call 1303, the terminal side telephone control section 210 notifies the ringing tone control section 211 of the incoming call. Upon receiving the notification, the ringing tone control section 211 transmits ringing tone data 213 to the AD conversion section, and a ringing tone is produced from the speaker 232.

Figure 6:
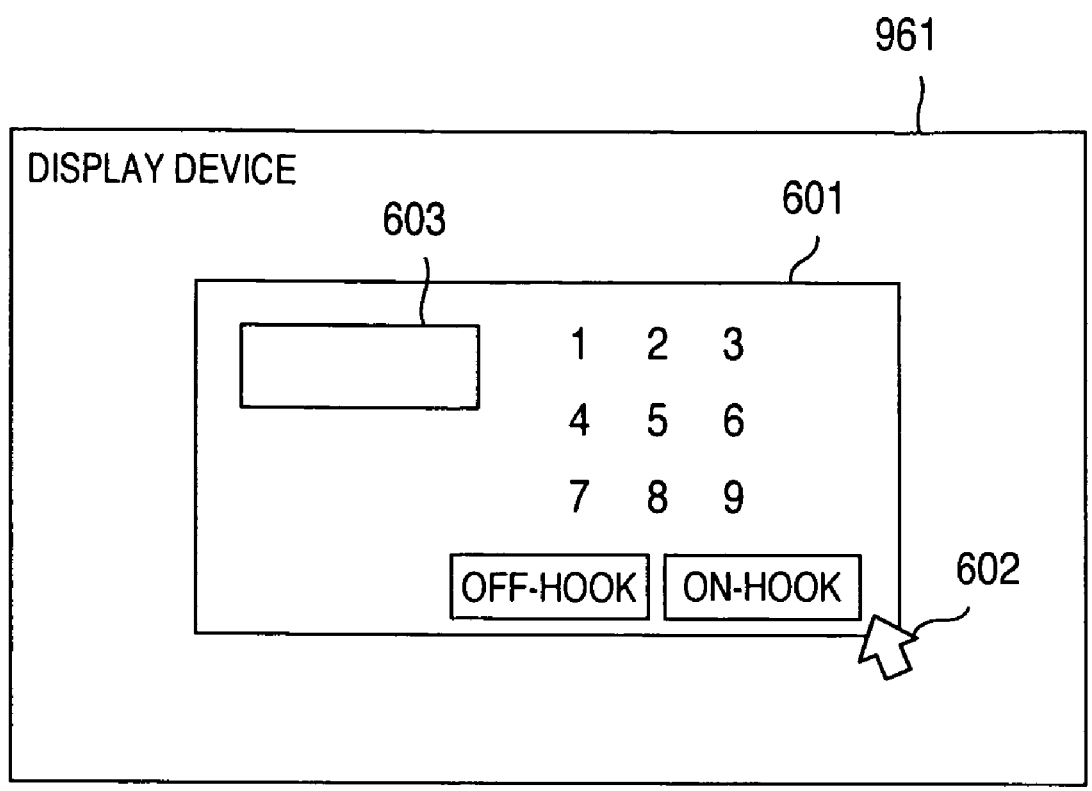
FIG. 6 is a diagram showing a screen interface of a telephone control section displayed on a screen display of a PTC terminal.
Figure 7:
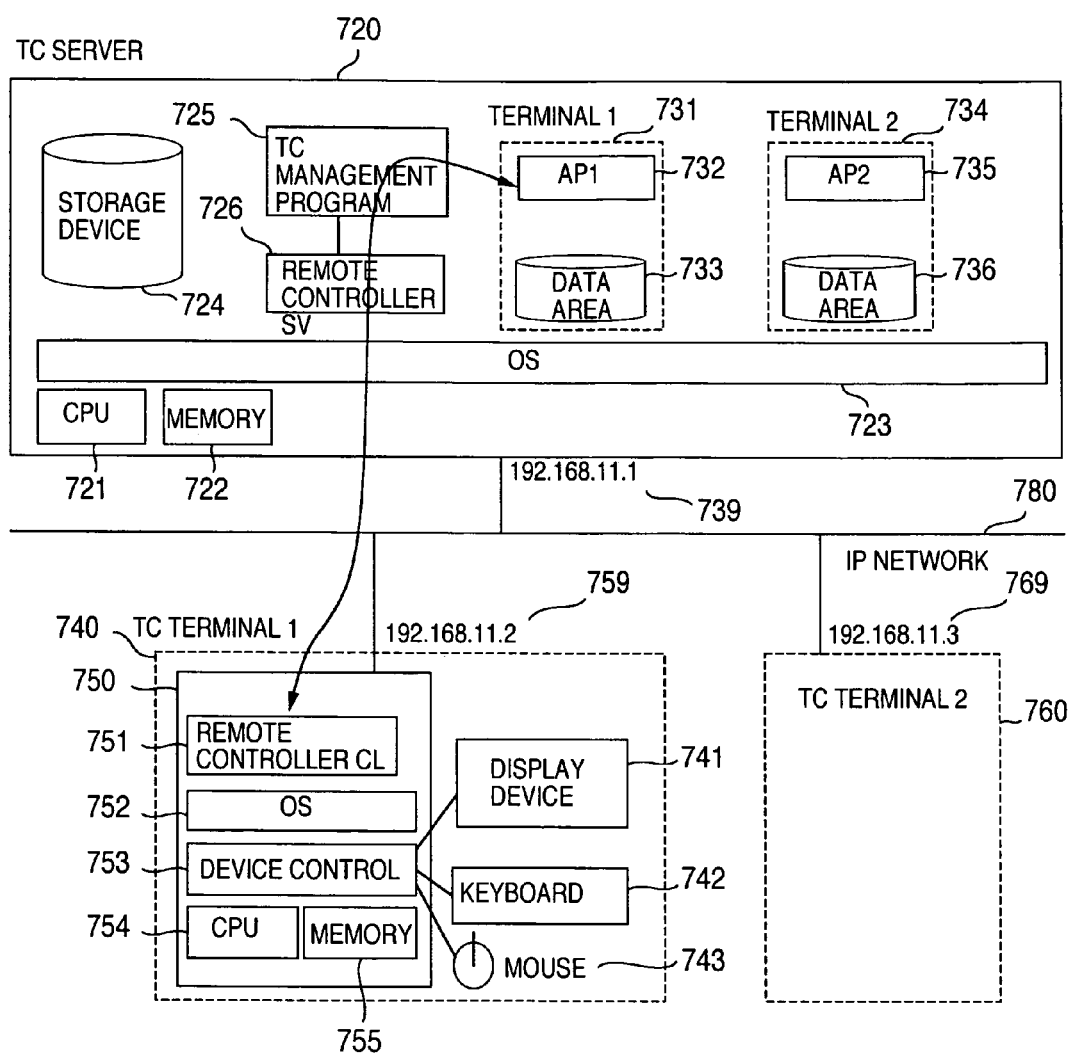
FIG. 7 is a diagram showing a configuration of a typical TC system.
Figure 8:
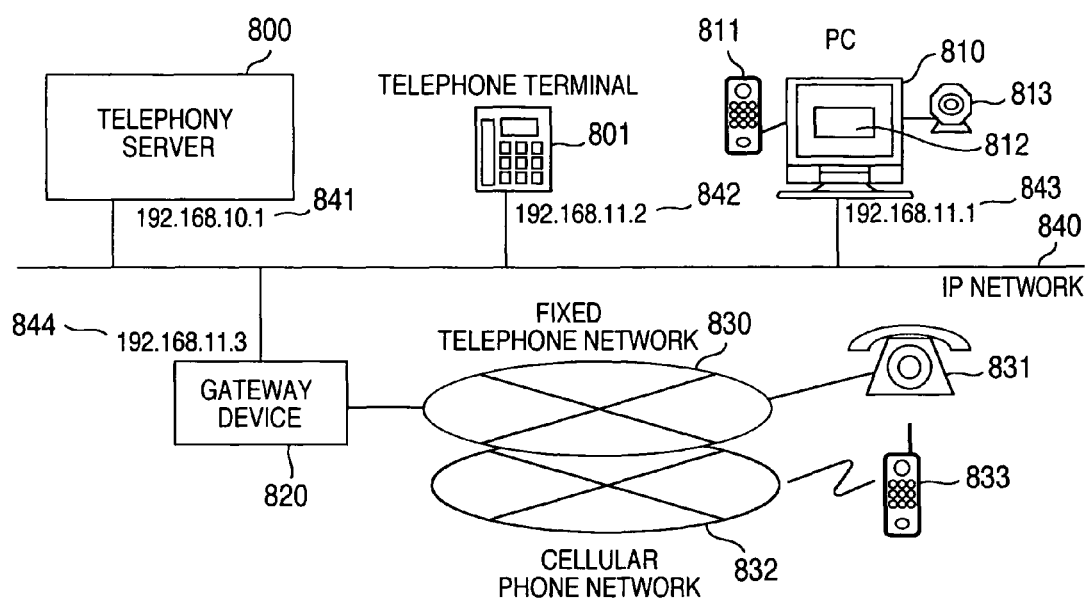
FIG. 8 is a diagram showing a system configuration of a typical IP phone.

The method of implementing dialing and other telephone operations according to the configuration of FIG. 2 is as follows. The server side telephone control section 111 of FIG. 1 has an interface that allows on-screen input/output. When the PTC server 110 is activated, a display device 961 of the PTC terminal 200 displays an input/output screen 601 shown in FIG. 6. For outgoing calls, calling out is possible through dial input by operating a mouse 964 or a keyboard 963. Also, for incoming calls, communication can be initiated by designating an on-screen off-hook button or the like.

According to the configuration of FIG. 2, since even the microphone 231 and the speaker 232 may employ telephone functions, the use of, for instance, a headset that integrates the microphone 231 and the speaker 232 may also be considered.

Figure 4:
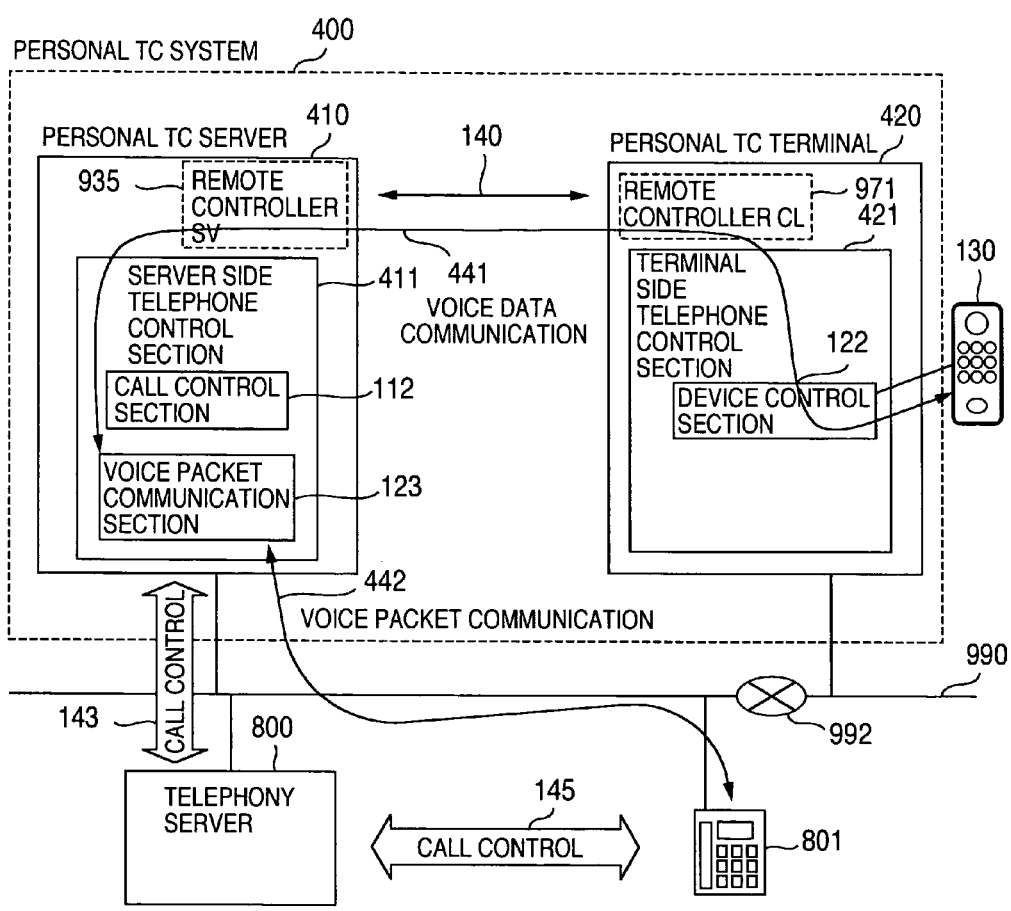
FIG. 4 is diagram showing a configuration of a PTC server side equipped with a voice packet communication section according to a PTC system.

FIG. 4 is diagram showing a configuration of a PTC system 400 comprising a PTC server side equipped with a voice packet communication section 123.

In the configuration of FIG. 4, use of the PTC terminal 420 as a single telephone terminal may be realized by designating the IP address of the PTC server 410 as the communication target IP address designated in the call connection processing shown in FIG. 12 or 13. More specifically, in FIG. 12, when making a call connection request to the telephony server 800, the IP address "192.168.1.1" of the PTC server 410 is set as the communication target IP address parameter. In addition, in FIG. 13, when sending a communication OK to the telephony server 800, the IP address "192.168.1.1" of the PTC server 410 is set as the communication target IP address parameter. This enables voice packet communication between the telephone terminal 801 and the PTC server 410.

After converting the voice packet data to voice data, the voice packet communication section 123 transmits to and/or receives from the terminal side telephone control section 421 the voice data. The terminal side telephone control section 421 performs voice input and/or output to the handset 130 via the device control section 122.

According to the configuration of FIG. 4, since voice data 441 passes through the PTC server 410, recording of communication may be easily realized by using voice recording programs or the like that run on the PTC server 410.

Incidentally, the voice packet communication section 123 may be equipped to the PTC terminal 120 side, as shown in FIG. 1, or equipped to the PTC server 410 side, as shown in FIG. 4, or equipped to both the PTC server 410 and the PTC terminal 420 to be switched from one to the other according to purpose of use.

Figure 5:
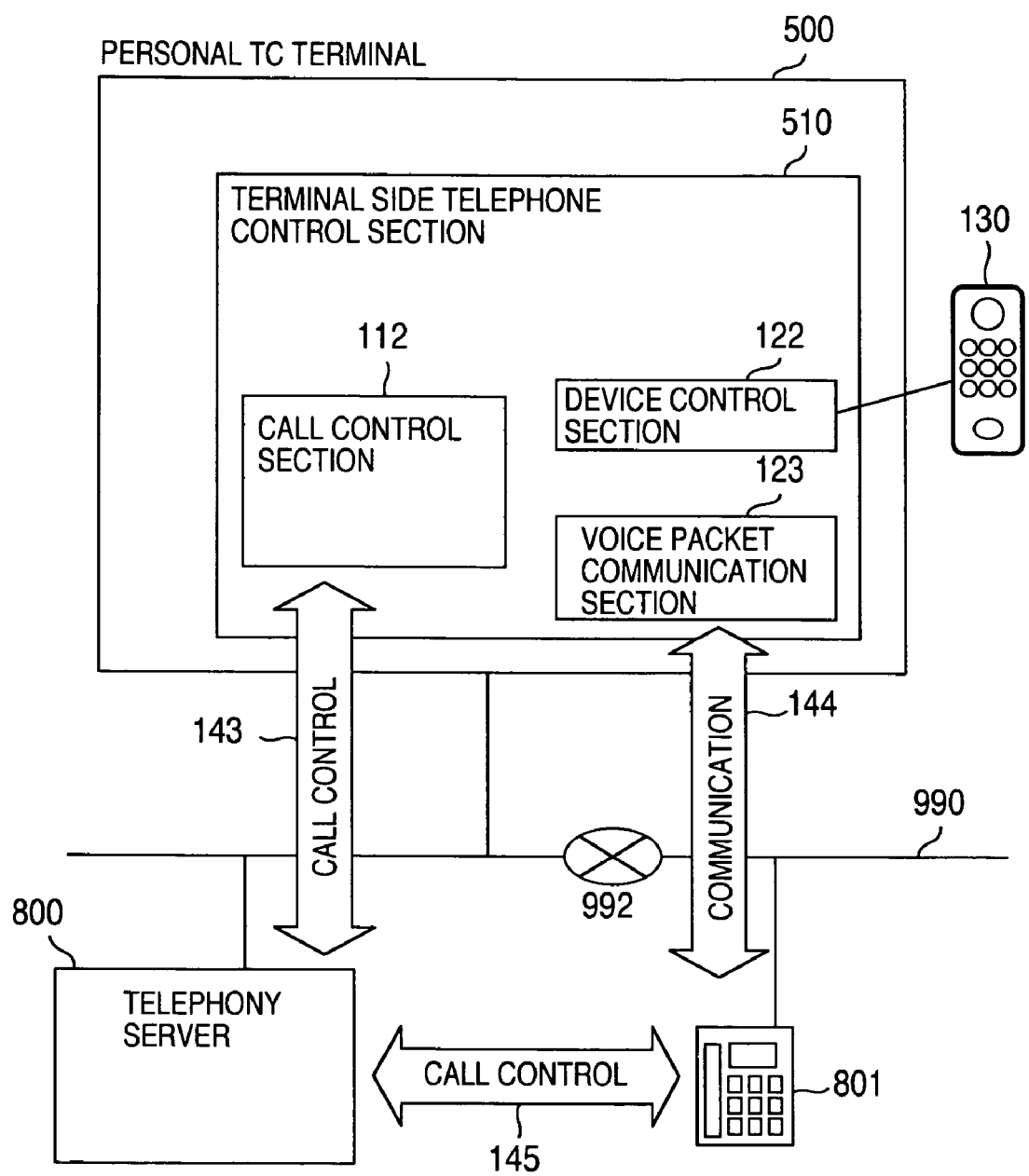
FIG. 5 is diagram showing a configuration of a PTC terminal equipped with a call control section.

FIG. 5 is diagram showing a block configuration of a PTC terminal 500 with the call control section 112 shown in FIG. 1 equipped to the PTC terminal 500 side.

In the configuration of FIG. 5, since the PTC terminal 500 single-handedly comprises a telephone function, the PTC terminal 500 may be used as a single telephone terminal totally independent of the operation of the PTC server 110.

In the configuration of FIG. 5, when constructing a telephone system using the PTC terminal 500 as a single telephone terminal, "192.168.1.2" is set in the telephone number management table 1001 in the telephony server 800 as the call control target IP address corresponding to "3000". This enables call connection between the telephony server 800 and the PTC terminal 500.

When the call control target IP address is the same as the communication target IP address, as in the configuration of FIG. 5, either the call connection target IP address may be set as the communication target IP address, or the parameter may be left unset in the call connection procedures of FIGS. 12 and 13. If no parameter is set for the communication target IP address, the telephony server 800 references the telephone number management table 1001, and by notifying the other party of the call connection target IP address as the communication target IP address, the IP addresses of both parties may be exchanged.

According to the configuration of FIG. 5, since telephone functions may be used through the PTC terminal 500 alone and totally independent of the operation of the PTC server 110, calls can be made, for example, even when the PTC server 110 is not turned on.

Figure 3:
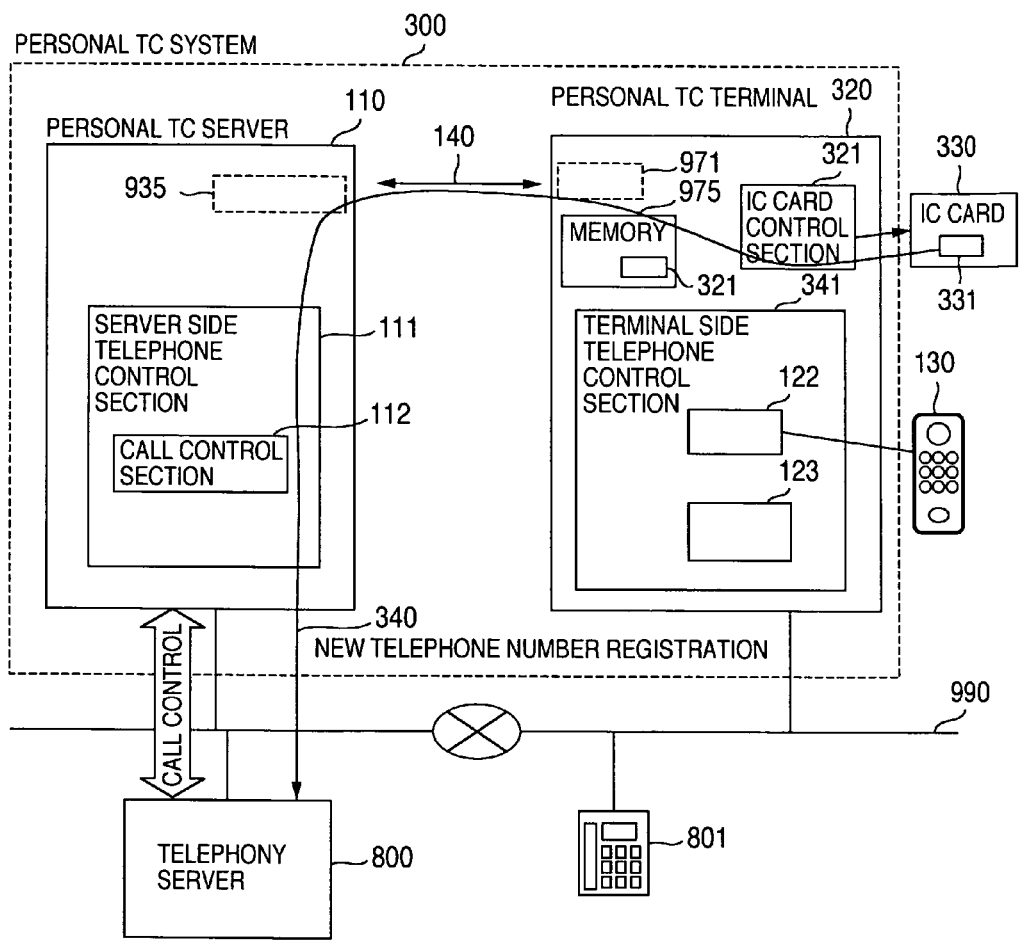
FIG. 3 is a diagram showing a PTC terminal configured with an IC card, according to a PTC system.

FIG. 3 is a diagram showing a block configuration of a PTC terminal 320, configured to allow connection of an IC card 330 and equipped with an IC card control section 321 that reads information from the IC card 330, and a configuration of a PTC system 300 using the PTC terminal 320 and a method for implementing telephone functions.

Telephone numbers are registered in advance in a telephone number storage area 331 of the IC card 330. When the IC card 330 is inserted, the terminal side telephone control section 341 reads a telephone number stored in the telephone number storage area 331 of the IC card 330 via the IC card control section 321, and transmits a telephone number registration notification with the new telephone number as a parameter to the server side telephone control section 111

Upon receiving this notification, the server side telephone control section 111 sends a registration request 340 for the new telephone number to the telephony server 800 via the call control section 112.

Upon receiving the registration request 340, the telephony server 800 rewrites the telephone number corresponding to the IP address in the telephone number management table to the new telephone number.

This renews the telephone number of the PTC system 300, and other telephone terminals can connect to the PTC system 300 by using the new telephone number.

In addition, other configurations wherein the IC card 330 is connected may be considered, such as a configuration wherein the IC card 330 is connected to the PC server 110 of FIG. 3, or a configuration wherein the IC card 330 is connected to the PTC terminal 500 shown in FIG. 5. In either configuration, the processing for telephone number registration and the like will be the same as above.

As described above, an advantage of the configuration of FIG. 3 is that the IP address of the connection target PTC server may be registered into the IC card 330. By arranging the IC card 330 to carry caller information as well, simply inserting the IC card will connect the PTC terminal 320 to a private desktop PC, and will further allow the PTC terminal 320 to be used as a telephone terminal with a personal extension number. Thus, a secure remote office environment may be achieved.

In addition, when using the PTC terminal 120 as a mobile device, by configuring, for example, a telephone program that is a function of the server side telephone control section 111 to link with a personal cellular phone, the PTC terminal 120 can be carried around together with the cellular phone.

In a corporate information system, when a TC system and an IP internal phone network are to be concurrently constructed, the present invention can provide an environment that allows mobile operations at a user's home or a business trip destination to be performed in a more secure and comfortable manner.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication system comprising an input and output device, a main device equipped with a CPU and a memory, and a network connecting said main device and said input and output device, wherein:

said main device includes a call control section for setting-up a call connection, and a remote control communication section for transmitting and receiving data with respect to said input and output device, said input and output device is a thin client managed by said main device, which includes a remote control communication section for transmitting and receiving data with respect to said main device, a display section for outputting the data received from said main device via said remote control section on a display, and a control section for performing transmission and reception of audio, video, or audio and video information to and from a connection target communication device, but does not have a function of setting-up a call connection by itself, in a case that a dialing operation to said connection target communication device is performed in said input and output device, said input and output device transmits a calling request for said connection target communication device in connection with said dialing operation and the address of said input and output device to said main device by employing said remote control communication section;

said call control section of said main device performs a call control of said connection target communication device thereby to transmit the address of said input and output device to said connection target communication device and receive the address of said connection target communication device from said connection target communication device via said network, and said remote control communication section of said main device transmits the address of said connection target communication to said input and output device so that a communication path is established between said input and output device and said connection target communication device using each other's addresses exchanged by said main device, with said communication path not including any path through said main device;

said control section of said input and output device enables to perform transmission and reception of audio, video or audio and video information directly between said input and output device and said connection target communication device through said communication path;

said main device is a server which manages data and a data creation program for creating said data, said input and output device is a terminal comprising a remote control unit for transmitting at least one of key and mouse input information to be used for creating said data based on remote control to said server and receiving data from said server, a display unit for displaying the data, an input unit for inputting therein control information for enabling the call connection by said call control means, and an audio packet communication unit for communicating said audio, video, or audio and video information with said connection target communication device through said network, and said connection target communication device comprising a telephone terminal or television conference terminal for communicating the audio, video, or audio and video information.

2. The communication system according to claim 1, said input and output device is a thin client terminal which notifies at least one of key and mouse input information to said server, and receives processing result from said server to display said result, said server is a thin client server comprising a remote control unit for processing based on the at least one of key and mouse input information from said thin client terminal, and transmitting the processing result to said input and output device, said connection target communication device is a telephone terminal or television conference terminal, and said network is configured to connect among said thin client terminal, said thin client server and said telephone terminal or television conference terminal.

3. A communication system comprising an input and output device, a main device equipped with a CPU and a memory, and a network connecting said main device and said input and output device, wherein:

said main device includes a call control section for setting-up a call connection, and a remote control communication section for transmitting and receiving data with respect to said input and output device;

said input and output device is a thin client managed by said main device, which includes a remote control communication section for transmitting and receiving data with respect to said main device, a display section for outputting the data received from said main device via said remote control section on a display, and a control section for performing transmission of audio, video, or audio and video information to and from a connection target communication device, but does not have a function of setting-up a call connection by itself, in a case that said call control section of said main device receives a call connection request for said input and output device and the address of said connection target communication device from said connection target communication device, said main device notifies an incoming call and the address of said connection target communication device to said input and output device through said remote control section;

in a case that said input and output device receives the notification of the incoming call and the address of said connection target communication device via said remote control section, said call control section of said main device transmits the address of said input and output device to said connection target communication device so that a communication path is established between said input and output device and said connection target communication device using each other's addresses exchanged by said main device, with said communication path not including any path through said main device, whereby the transmission and reception of audio, video, or audio and video information is enabled to thereafter conduct a call directly between said input and output device and said connection target communication device through said communication path; and where said main device is a server which manages data and a data creation program for creating said data, said input and output device is a terminal comprising a remote control unit for transmitting key or mouse input information to be used for creating said data based on remote control to said server, and for receiving data from said server, a display unit for displaying the data, an input unit for inputting the incoming call and responding thereto, an audio packet communication unit for transmitting said audio, video, or audio and video information to said connection target communication device through said network based on said call control, and said connection target communication device is a telephone terminal or television conference terminal for communicating said audio, video, or audio and video information.

4. The communication system according to claim 3, where said input and output device is a thin client terminal for notifying at least one of key and mouse input information to said server, receiving a processing result from said server, and displaying said processing result, said call control means of said server is a thin client server comprising a remote control unit for notifying the incoming call to said thin client terminal based on the call connection request from the connection target communication device, said connection target communication device is a telephone terminal or television conference terminal, and said network is configured to connect among said thin client terminal, said thin client server and said telephone terminal or television conference terminal.

5. A communication system comprising a thin-client input and output device, a thin-client call-connect server equipped with a CPU and a memory, and a network connecting said thin-client call-connect server and said thin-client input and output device, wherein:

said thin-client call-connect server managed by said thin-client call-connect server includes a call control section for setting-up a call connection, and a remote control communication section for transmitting and receiving data with respect to said thin-client input and output device, said thin-client input and output device includes a remote control communication section for transmitting and receiving data with respect to said thin-client call-connect server, a display section for outputting the data received from said thin-client call-connect server via said remote control section on a display, and a control section for performing transmission and reception of audio, video, or audio and video information to and from a connection target communication device, but does not have a function of setting-up a call connection by itself, in a case that a dialing operation to said connection target communication device is performed in said thin-client input and output device, said thin-client input and output device transmits a calling request for said connection target communication device in connection with said dialing operation and the address of said input and output device to said thin-client call-connect server by employing said remote control communication section;

said call control section of said thin-client call-connect server performs a call control of said connection target communication device thereby to transmit the address of said thin-client input and output device to said connection target communication device and receive the address of said connection target communication device from said connection target communication device via said network, and said remote control communication section of said thin-client call-connect server transmits the address of said connection target communication to said thin-client input and output device so that a communication path is established between said thin-client input and output device and said connection target communication device using each other's addresses exchanged by said thin-client call-connect server, with said communication path not including any path through said thin-client call-connect server;

said control section of said thin-client input and output device enables to perform audio, video, or audio and video transmission and reception directly between said thin-client input and output device and said connection target communication device through said communication path;

said thin-client call-connect server is a server which manages data and a data creation program for creating said data, said thin-client input and output device is a terminal comprising a remote control unit for transmitting at least one of key and mouse input information to be used for creating said data based on remote control to said server and receiving data from said server, a display unit for displaying the data, an input unit for inputting therein control information for enabling the call connection by said call control means, and an audio packet communication unit for communicating said audio, video, or audio and video information with said connection target communication device through said network, and said connection target communication device comprising a telephone terminal or television conference terminal for communicating the audio, video, or audio and video information.

6. The communication system according to claim 5, said thin-client input and output device is a thin client terminal which notifies at least one of key and mouse input information to said server, and receives processing result from said server to display said result, said server comprising a remote control unit for processing based on the at least one of key and mouse input information from said thin client terminal, and transmitting the processing result to said thin-client input and output device, said connection target communication device is a telephone terminal or television conference terminal, and said network is configured to connect among said thin client terminal, said server and said telephone terminal or television conference terminal.

7. A communication system comprising a thin-client input and output device, a thin-client call-connect server equipped with a CPU and a memory, and a network connecting said thin-client call-connect server and said thin-client input and output device, wherein:

said thin-client call-connect server includes a call control section for setting-up a call connection, and a remote control communication section for transmitting and receiving data with respect to said thin-client input and output device;

said thin-client input and output device managed by said thin-client call-connection server includes a remote control communication section for transmitting and receiving data with respect to said thin-client call-connect server, a display section for outputting the data received from said thin-client call-connect server via said remote control section on a display, and a control section for performing transmission of audio, video, or audio and video information to and from a connection target communication device, but does not have a function of setting-up a call connection by itself, in a case that said call control section of said thin-client call-connect server receives a call connection request for said thin-client input and output device and the address of said connection target communication device from said connection target communication device, said thin-client call-connect server notifies an incoming call and the address of said connection target communication device to said thin-client input and output device through said remote control section;

in a case that said thin-client input and output device receives the notification of the incoming call and the address of said connection target communication device via said remote control section, said call control section of said thin-client call-connect server transmits the address of said thin-client input and output device to said connection target communication device to that a communication path is established between said thin-client input and output device and said connection target communication device using each other's addresses exchanged by said thin-client call-connect server, with said communication path not including any path through said thin-client call-connect server, whereby the audio, video, or audio and video transmission and reception is enabled to thereafter conduct a call directly between said thin-client input and output device and said connection target communication device through said communication path; and where said thin-client call-connect server manages data and a data creation program for creating said data, said thin-client input and output device is a terminal comprising a remote control unit for transmitting key or mouse input information to be used for creating said data based on remote control to said server, and for receiving data from said server, a display unit for displaying the data, an input unit for inputting the incoming call and responding thereto, an audio packet communication unit for transmitting said audio, video, or audio and video information to said connection target communication device through said network based on said call control, and said connection target communication device is a telephone terminal or television conference terminal for communicating said audio, video, or audio and video information.

8. The communication system according to claim 7, where said thin-client input and output device is for notifying at least one of key and mouse input information to said server, receiving a processing result from said server, and displaying said processing result, said call control means of said server comprising a remote control unit for notifying the incoming call to said thin client terminal based on the call connection request from the connection target communication device, said connection target communication device is a telephone terminal or television conference terminal, and said network is configured to connect among said thin client terminal, said thin client server and said telephone terminal or television conference terminal.

9. A communication system comprising an input and output device, a main device equipped with a CPU and a memory, and a network connecting said main device and said input and output device, wherein:

said main device includes a call control section for effecting an address exchange for addresses to form a direct call connection between said input and output device and a connection target communication device, and a remote control communication section for transmitting and receiving data with respect to said input and output device, said input and output device is a thin client managed by said main device, which includes a remote control communication section for transmitting and receiving data with respect to said address exchange effected by said main device, a display section, and a control section for performing transmission and reception of audio, video, or audio and video information to and from the connection target communication device, but does not have a function of setting-up said address exchange by itself, in a case that a dialing operation to said connection target communication device is performed in said input and output device, said input and output device transmits a calling request for said connection target communication device in connection with said dialing operation and the address of said input and output device to said main device, by employing said remote control communication section;

said call control section of said main device performs a call control of said connection target communication device thereby to transmit the address of said input and output device to said connection target communication device and receive the address of said connection target communication device from said connection target communication device via said network, and said remote control communication section of said main device transmits the address of said connection target communication to said input and output device so that a direct communication path is thereafter established between said input and output device and said connection target communication device using each other's addresses exchanged by said main device, with said direct communication path not including any path through said main device;

said control section of said input and output device initiating transmission and reception of audio, video or audio and video information directly between said input and output device and said connection target communication device upon said direct communication path being thereafter established between said input and output device and said connection target communication device using each other's addresses exchanged by said main device, and with said direct communication path not including any path through said main device; and where said main device is a server which manages data and a data creation program for creating said data, said input and output device is a terminal comprising a remote control unit for transmitting key or mouse input information to be used for creating said data based on remote control to said server, and for receiving data from said server, a display unit for displaying the data, an input unit for inputting the incoming call and responding thereto, an audio packet communication unit for transmitting said audio, video, or audio and video information to said connection target communication device through said network based on said call control, and said connection target communication device is a telephone terminal or television conference terminal for communicating said audio, video, or audio and video information.

* * * * *